United States Patent
Yao et al.

(10) Patent No.: US 12,488,624 B2
(45) Date of Patent: Dec. 2, 2025

(54) METHOD AND APPARATUS FOR EXTRACTING BIOLOGICAL FEATURES, DEVICE, MEDIUM, AND PROGRAM PRODUCT

(71) Applicant: TENCENT TECHNOLOGY (SHENZHEN) COMPANY LIMITED, Guangdong (CN)

(72) Inventors: Taiping Yao, Shenzhen (CN); Keyue Zhang, Shenzhen (CN); Shuang Wu, Shenzhen (CN); Jia Meng, Shenzhen (CN); Shouhong Ding, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 414 days.

(21) Appl. No.: 18/060,366

(22) Filed: Nov. 30, 2022

(65) Prior Publication Data
US 2023/0095182 A1 Mar. 30, 2023

Related U.S. Application Data

(63) Continuation of application No. PCT/CN2022/079193, filed on Mar. 4, 2022.

(30) Foreign Application Priority Data

Mar. 8, 2021 (CN) .......................... 202110250942.5

(51) Int. Cl.
| | | |
|---|---|---|
| G06V 40/40 | (2022.01) | |
| G06T 3/40 | (2024.01) | |
| G06T 7/11 | (2017.01) | |
| G06T 7/50 | (2017.01) | |
| G06V 10/44 | (2022.01) | |
| G06V 10/764 | (2022.01) | |

(52) U.S. Cl.
CPC ................ *G06V 40/40* (2022.01); *G06T 3/40* (2013.01); *G06T 7/11* (2017.01); *G06T 7/50* (2017.01); *G06V 10/44* (2022.01); *G06V 10/764* (2022.01)

(58) Field of Classification Search
CPC ...... G06V 40/40; G06V 40/172; G06V 40/45; G06V 10/44; G06V 10/764; G06T 3/40;
(Continued)

(56) References Cited

U.S. PATENT DOCUMENTS

| | | | | |
|---|---|---|---|---|
| 8,116,538 | B2 * | 2/2012 | Kim | ...................... G06V 10/772 |
| | | | | 382/160 |
| 2006/0034517 | A1 * | 2/2006 | Bober | .................. G06V 40/171 |
| | | | | 382/118 |

(Continued)

FOREIGN PATENT DOCUMENTS

| | | |
|---|---|---|
| CN | 109033938 A | 12/2018 |
| CN | 109117755 A | 1/2019 |

(Continued)

OTHER PUBLICATIONS

Alexey Dosovitskiy, et al., "An Image is Worth 16 x 16 Words: Transformers for Image Recognition at Scale", arXiv:2010.11929v2 [cs.CV], ICLR, Jun. 3, 2021, pp. 1-22.

(Continued)

*Primary Examiner* — John B Strege
(74) *Attorney, Agent, or Firm* — Sughrue Mion, PLLC

(57) ABSTRACT

A method and apparatus for extracting biological features, a device, a medium, and a program product, relating to the field of image processing. The method includes generating an image sequence according to a biological feature image, the image sequence including the biological feature image and n local image blocks, the local image blocks being obtained by segmenting the biological feature image, n (Continued)

being a positive integer, generating a feature vector group based on the image sequence, feature vectors in the feature vector group being generated based on a feature information interaction result between the biological feature image and the local image blocks and a feature information interaction result between the local image blocks, and taking a feature vector corresponding to the biological feature image in the feature vector group as biological feature information of the biological feature image.

16 Claims, 9 Drawing Sheets

(58) Field of Classification Search
CPC ... G06T 7/11; G06T 7/50; G06T 2207/10016; G06T 2207/10024; G06T 2207/20021; G06T 2207/20081; G06T 2207/20084; G06T 2207/30201; G06Q 20/40; G06Q 20/40145
See application file for complete search history.

(56) References Cited

U.S. PATENT DOCUMENTS

| | | | | |
|---|---|---|---|---|
| 2010/0329544 | A1* | 12/2010 | Sabe | G06V 10/774 382/159 |
| 2014/0050372 | A1* | 2/2014 | Qi | G06V 40/172 382/118 |
| 2017/0061198 | A1* | 3/2017 | Choi | G06T 7/73 |
| 2017/0316269 | A1 | 11/2017 | Bailer et al. | |
| 2019/0073520 | A1* | 3/2019 | Ayyar | G06V 40/173 |
| 2020/0042770 | A1* | 2/2020 | Yan | G06V 40/172 |
| 2025/0069397 | A1* | 2/2025 | Luo | G06V 20/49 |
| 2025/0074486 | A1* | 3/2025 | Blouin | B61L 15/0018 |

FOREIGN PATENT DOCUMENTS

| | | |
|---|---|---|
| CN | 111652066 A | 9/2020 |
| CN | 111767906 A | 10/2020 |
| CN | 112116074 A | 12/2020 |
| CN | 112215180 A | 1/2021 |

OTHER PUBLICATIONS

International Search Report for PCT/CN2022/079193 dated Apr. 26, 2022.

Wang et al., "Integration of global and local feature for single sample face recognition", Journal of Central South University (Science and Technology), vol. 42, Suppl. 1, Sep. 2011, pp. 760-764.

Yuan et al. "Tokens-to-Token ViT: Training Vision Transformers from Scratch on ImageNet", arXiv, Jan. 28, 2021, pp. 558-567.

Communication issued Dec. 4, 2024 in Chinese application No. 202110250942.5.

* cited by examiner

METHOD AND APPARATUS FOR EXTRACTING BIOLOGICAL FEATURES, DEVICE, MEDIUM, AND PROGRAM PRODUCT

CROSS-REFERENCE TO RELATED APPLICATIONS

This application is a continuation application of International Application No. PCT/CN2022/079193, filed on Mar. 4, 2022, which claims priority to Chinese Patent Application No. 202110250942.5, filed on Mar. 8, 2021, the disclosures of each of which being incorporated by reference herein in their entireties.

FIELD

The disclosure relates to the field of image processing, and in particular, to a method and apparatus for extracting biological features, a device, a medium, and a program product.

BACKGROUND

Biological features may be used for living body detection, identity authentication, etc. The living body detection is used for detecting whether an object in an image is a living body, which means a living object. The living body detection is usually used in combination with other technologies in actual use, and is often used in face payment, remote identity authentication, face verification, and other scenarios.

In the related art, based on a model of a convolutional neural network, a convolutional kernel is arranged on a biological feature image, local information on the biological feature image is aggregated through a sliding window algorithm, and a good feature representation is obtained. Then, a pooling operation is performed to suppress a smaller response and highlight a higher response. Next, a new round of convolution and pooling is performed. After several rounds of repeated operations, a higher-level feature representation is obtained, and then specific task processing is performed to obtain a result of living body detection.

However, the related art focuses on the aggregation of local features, and extracted biological features are not accurate enough.

SUMMARY

According to various embodiments, a method for extracting biological features, performed by a computer device, may include: generating an image sequence according to a biological feature image, the image sequence including the biological feature image and n local image blocks, the local image blocks being obtained by segmenting the biological feature image, n being a positive integer; generating a feature vector group based on the image sequence, feature vectors in the feature vector group being generated based on a feature information interaction result between the biological feature image and the local image blocks and a feature information interaction result between the local image blocks; and taking a feature vector corresponding to the biological feature image in the feature vector group as biological feature information of the biological feature image.

According to various embodiments, an apparatus for extracting biological features, a computer device, a non-transitory computer-readable storage medium, and a computer program product or a computer program consistent with the method may also be provided.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
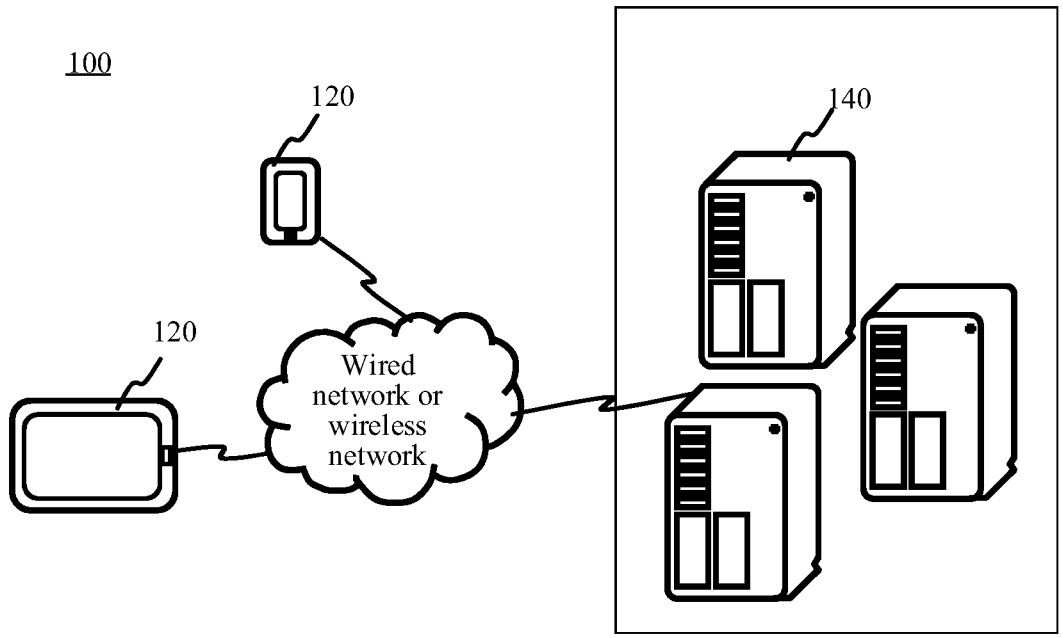
FIG. 1 is a schematic structural diagram of a computer system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

According to some embodiments, an inputted biological feature image is segmented into several parts, and a feature vector group is extracted from the original biological feature image and local image blocks obtained after segmentation, so as to obtain biological feature information of the biological feature image. According to the method, global feature information is obtained through the biological feature image, local feature information is obtained through the local image blocks, global-to-local and local-to-local relationships are introduced, and the biological feature information can be extracted from a more comprehensive perspective, so that the extracted biological feature information is more accurate.

First, terms involved in some embodiments are introduced:

Artificial Intelligence (AI): The AI is a theory, method, technology and application system that uses digital computers or machines controlled by digital computers to simulate, extend and expand human intelligence, perceive the environment, acquire knowledge, and use knowledge to obtain the best results. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include fields such as a computer vision technology, a speech processing technology, a natural language processing technology, machine learning/deep learning, and the like.

Computer Vision (CV): The CV is a science that studies how to use a machine to "see", and furthermore, machine vision that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, the CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common input recognition and fingerprint recognition.

Machine Learning (ML): ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, so as to keep improving its performance. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

Living body detection: method for determining physiological features of an object in some identity authentication scenarios. In face recognition applications, living body detection can verify whether a user is a real living body who is performing an operation by using face key point positioning, face tracking and other technologies through blinking, mouth opening, head shaking, nodding, and other combined actions. In an actual scenario, common attacks such as photos, face changing, masks, occlusions, and screen re-shooting can be effectively resisted, so as to assist users in identifying fraud and protecting their interests.

Transformer model: including a complete Encoder-Decoder framework, mainly composed of an attention mechanism. Exemplarily, the transformer model is composed of six encoding modules each divided into two parts: a self-attention layer and a forward neural network. The self-attention layer is mainly responsible for calculating relationships of respective inputs, performing weighting to obtain results as outputs, and then transmitting the outputs to a classification module for classification.

Attention mechanism: a method proposed to solve the problem by imitating human attention, which may quickly screen high-value information from a large amount of information and usually used in a model of encoder+decoder. The attention mechanism may assist the model in assigning different weights to each part of the input, extracting more critical and important information, and making more accurate judgments by the model without incurring higher overheads to the calculation and storage of the model. For example, when the model of encoder+decoder is used for translation, one or more inputted words in an inputted sequence correspond to one or more outputted words in an outputted sequence. If each word in a sentence is assigned with the same weight, it is unreasonable. Therefore, different words will be assigned with different weight values to distinguish important parts in the sentence. Assuming that an inputted sentence is "Today, Ming runs", an outputted sentence is "今天 小明跑步". Words "今天", "小明", and "跑步" may be extracted from the translated sentence. Obviously, the three words have different importance degrees in the translated sentence. The importance degree of the word "今天" is not higher than those of the words "小明" and "跑步". Therefore, a weight value of the word "今天" may be set as 0.2, and weight values of the words "小明" and "跑步" may be set as 0.4, so as to improve the importance degrees of the words "小明" and "跑步".

All-zero map: When pixel points in an image are assigned with RGB values (the RGB value obtains various colors by the change and mutual superposition of three color channels: red (R, red), green (G, green), and blue (B, blue), RGB being colors representing the red channel, the green channel, and the blue channel), the RGB values of all the pixel points in the image are all assigned with 0 to obtain an image. Since the corresponding pixel point does not carry any color information in a case that the RGB value is 0, the pixel point is black. Therefore, an all-zero map may also be considered as an all-black image in which all pixel points are black.

Information (including but not limited to user equipment information, user personal information, etc.), data (including but not limited to data used for analysis, stored data, displayed data, etc.), and signals are all authorized by users or fully authorized by all parties, and the collection, use, and processing of relevant data are required to comply with relevant laws, regulations, and standards of relevant countries and regions. For example, biological feature images are acquired as being fully authorized.

FIG. 1 is a schematic structural diagram of a computer system according to some embodiments. The computer system 100 includes: a terminal 120 and a server 140.

The terminal 120 is installed with an application related to living body detection. The application may be an applet in app (application), or a specialized application, or a web client. Exemplarily, a user performs operations related to living body detection on the terminal 120. For example, the user is ready to use a face payment function. In order to ensure the security and reliability of a payment process, it is necessary to firstly perform living body detection on a biological feature image acquired by the terminal 120, thereby preventing transactions resulting from illegal attacks, and protecting the interests of individuals and the public. The terminal 120 is at least one of a smartphone, a tablet computer, an e-book reader, an MP3 player, an MP4 player, a laptop portable computer, a shopping device, a scanning device, and a desktop computer.

The terminal 120 is connected to the server 140 by using a wireless network or a wired network.

The server 140 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The server 140 is configured to provide a background service for a living body detection application and transmits a result of living body detection to the terminal 120. In some embodiments, the server 140 is responsible for primary computing work, and the terminal 120 is responsible for secondary computing work. Alternatively, the server 140 is in charge of secondary computing work, and the terminal 120 is in charge of primary computing work. Alternatively, a distributed computing architecture is adopted between the server 140 and the terminal 120 to perform collaborative computing.

Figure 2:
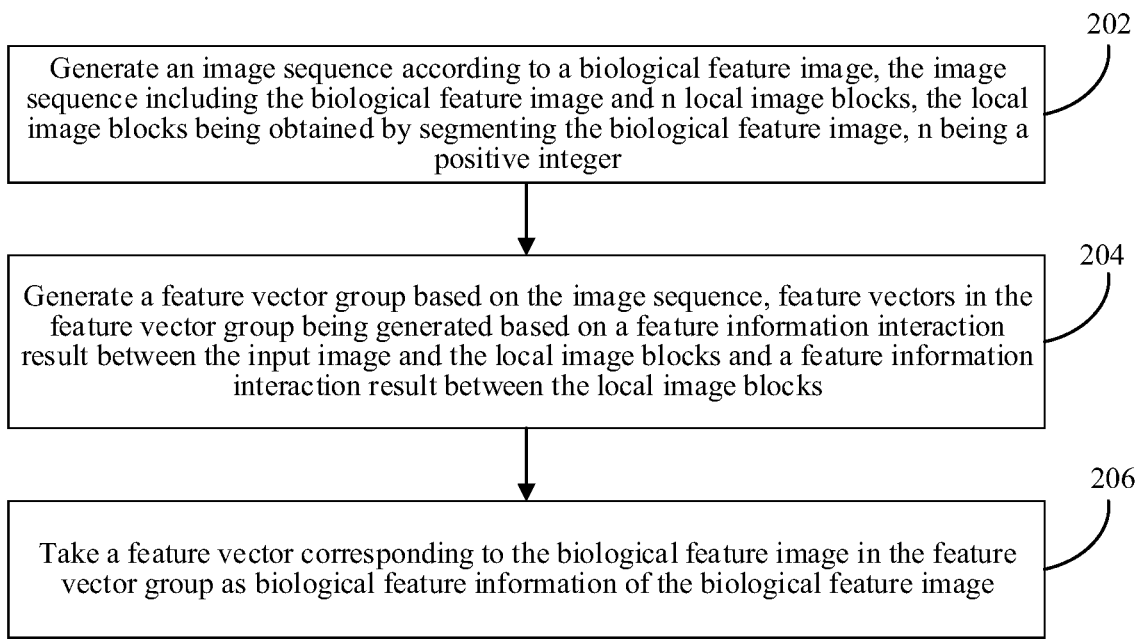
FIG. 2 is a schematic flowchart of a method for extracting biological features according to some embodiments.

FIG. 2 shows a schematic flowchart of a method for extracting biological features according to some embodiments. The method may be performed by the terminal 120 shown in FIG. 1. The method includes the following operations:

Operation 202: Generate an image sequence according to a biological feature image, the image sequence including the biological feature image and n local image blocks, the local image blocks being obtained by segmenting the biological feature image, n being a positive integer.

The biological feature image refers to an image including biological features inherent to a human body. In some embodiments, the biological feature image includes at least one of a face image, a fingerprint image, a palm print image, an iris image, and a vein image.

The biological feature image is acquired by: at least one of a manner of capturing via a camera in real time, a manner of accessing a local storage space, a manner of transmitting from other terminals, and a manner of downloading from the Internet. The manners of acquiring the biological feature image are not limited thereto.

Exemplarily, a terminal captures a facial video of a user through a camera, and intercepts one or more frames of images in the facial video as a biological feature image.

Figure 3:
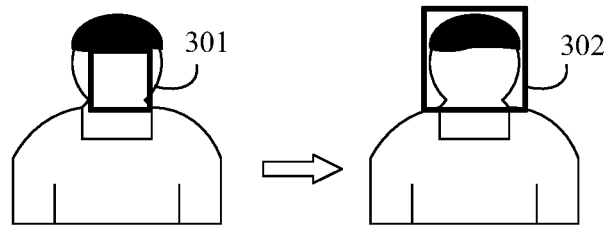
FIG. 3 is a schematic flowchart of a method for extracting biological features according to some embodiments.

In an example that the biological feature image includes a face, after an image is acquired, a face region in the image is acquired and expanded according to a preset proportion coefficient, and the expanded face region is taken as a face image. Exemplarily, as shown in FIG. 3, after an image is obtained, a face region 301 is determined through a human face detection technology, and then the face region 301 is expanded to obtain an expanded face region 302. Since the face detection technology preferentially frames the five sense organs of a face, such as mouth, eyes, nose, and ears, edge parts on the face may be omitted. For example, when using the face detection technology, images at the chin and hair may be omitted, resulting in partial images on the face being omitted, so that biological feature information obtained finally has a large deviation from an actual situation.

The image sequence is composed of a biological feature image and local image blocks. The local image blocks are obtained by segmenting the biological feature image.

In some embodiments, the local image blocks have the same size, and a complete biological feature image may be obtained by stitching. Still, some embodiments does not exclude the following cases:

1. Local image blocks are obtained by segmenting a biological feature image, but a complete biological feature image cannot be obtained by stitching the local image blocks. Exemplarily, the biological feature image is segmented to obtain nine local image blocks, and eight of the local image blocks are taken to constitute an image sequence.

2. Local image blocks have different sizes, and a complete biological feature image may be obtained by stitching the local image blocks. Exemplarily, a biological feature image with a size of 3*3 is segmented into a 1*1 local image block, a 2*2 local image block, a 1*2 local image block, and a 2*1 local image block.

3. Images of local image blocks have repeated parts. Exemplarily, a biological feature image with a size of 2*3 is segmented into two 2*2 local image blocks, and then the two local image blocks obtained have repeated parts.

The above three cases are only used for indicating an implementation method which is easy to be popularized, and are not limited thereto.

Operation 204: Generate a feature vector group based on the image sequence, feature vectors in the feature vector group being generated based on a feature information interaction result between the biological feature image and the local image blocks and a feature information interaction result between the local image blocks.

Feature vectors in the feature vector group are generated based on a feature information interaction result between the biological feature image and the local image blocks and a feature information interaction result between the local image blocks. Specifically, the biological feature image mainly carries global feature information, while the local image blocks mainly carry local feature information. In the process of generating a target feature vector, both an interaction between the global feature information and the local feature information and an interaction between the local feature information are present, whereby the outputted target feature vector includes complete feature information in the biological feature image, and biological feature information can be better extracted.

The feature vectors in the feature vector group correspond to the biological feature image and the local image blocks on a one-to-one basis. Exemplarily, feature vector 1 corresponds to the biological feature image, feature vector 2 corresponds to local image block A, and feature vector 3 corresponds to local image block B.

In some embodiments, an interaction relationship between the global feature information and the local feature information in the biological feature image and an interaction relationship between the local feature information are extracted by a model having an image sequence processing capability. Exemplarily, the model is one of a transformer model, embeddings from language models (ELMo), a text convolutional neural networks (Text CNN) model, a text recurrent neural network (Text RNN), text recurrent-convolutional neural networks (Text R-CNN), a text recurrent convolutional neural network, a bidirectional long short-term memory network, and a bidirectional long short-term memory text relationship double-recurrent neural network.

In some embodiments, the image sequence is inputted into a natural language processing (NLP) model to generate a feature vector group.

Operation 206: Take a feature vector corresponding to the biological feature image in the feature vector group as biological feature information of the biological feature image.

The biological feature information includes feature information corresponding to at least one of fingerprint, palm print, iris, face, and vein.

In some embodiments, the biological feature information may be used for realizing living body detection. Exemplarily, data processing is performed on the biological feature information through a first classification network, and a first prediction score is outputted. The first classification network is used for classifying the biological feature information according to living body information in the biological feature information. It is determined that an object in the biological feature image is a living body according to the first prediction score. In some embodiments, the prediction score has a value range. Exemplarily, the outputted prediction score belongs to an interval (0, 1). On the one hand, it is determined that an object in the biological feature image is a living body in response to the first prediction score being greater than a first determination threshold. On the other hand, it is determined that an object in the biological feature image is not a living body in response to the first prediction score being not greater than a first determination threshold.

Exemplarily, the first determination threshold is set as 0.5, and when the first prediction score is greater than 0.5, it is determined that an object in the biological feature image is a living body. When the first prediction score is less than 0.5, it is determined that an object in the biological feature image is not a living body.

In some embodiments, the biological feature information may also be used for realizing identity recognition. Exemplarily, data processing is performed on the biological feature information through a second classification network, and a second prediction score is outputted. The second classification network is used for classifying the biological feature information according to identity information in the biological feature information. It is determined that an organism in the biological feature image is a target organism according to the second prediction score. On the one hand, it is determined that an organism in the biological feature image is a target organism in response to the second prediction score being greater than a second determination threshold. On the other hand, it is determined that an organism in the biological feature image is not a target organism in response to the second prediction score being not greater than a second determination threshold.

In some embodiments, the second determination threshold is set as 0.4, and when the second prediction score is greater than 0.4, it is determined that a user in the biological feature image is user A. When the first prediction score is less than 0.4, it is determined that a user in the biological feature image is not user A.

In summary, according to some embodiments, an inputted biological feature image is segmented into several parts, and a feature vector group is extracted from the original biological feature image and local image blocks obtained after segmentation, so as to obtain biological feature information of the biological feature image. According to the method, global feature information is obtained through the biological feature image, local feature information is obtained through the local image blocks, global-to-local and local-to-local relationships are introduced, and the biological feature information can be extracted from a more comprehensive perspective, so that the extracted biological feature information is more accurate.

In the following embodiments, in a living body detection scenario, the description is made with an example that the biological feature image is a face image. A person skilled in the art is to be aware that the face image may also be at least one of a fingerprint image, a palm print image, an iris image, and a vein image.

Figure 4:
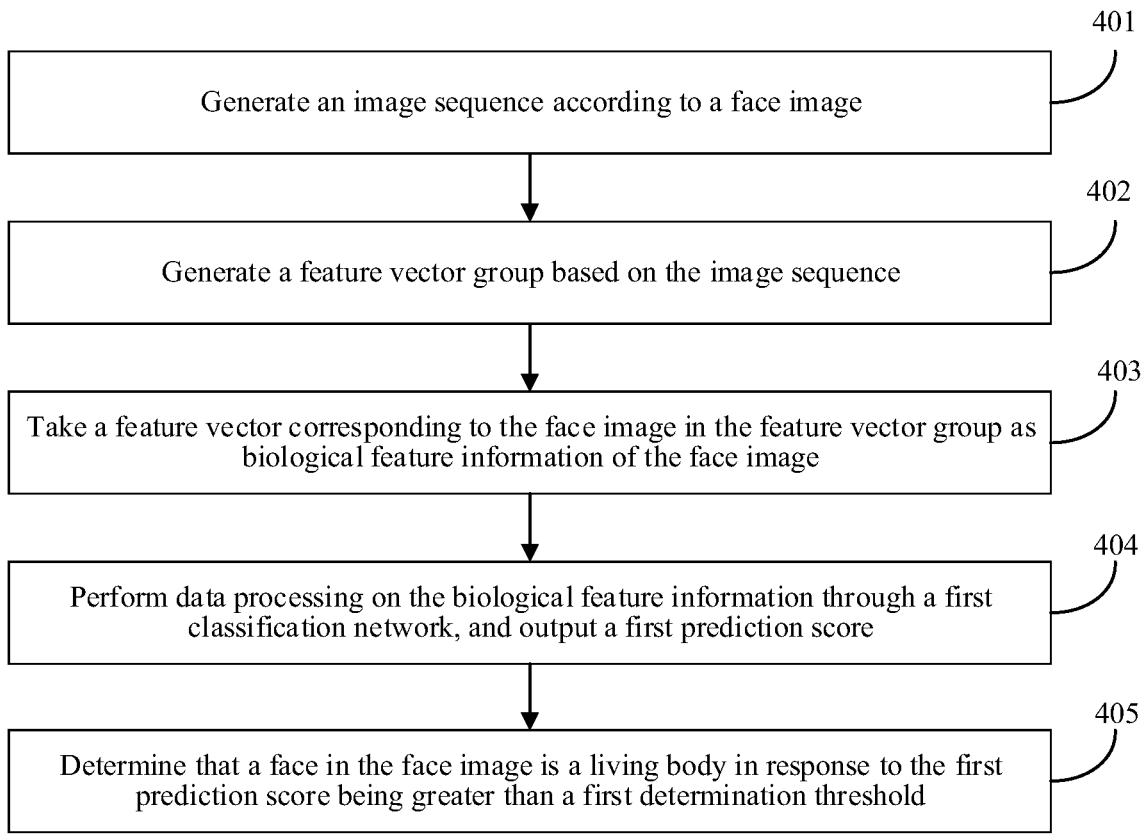
FIG. 4 is a schematic flowchart of a living body detection method according to some embodiments.

FIG. 4 shows a schematic flowchart of a living body detection method according to some embodiments. The method may be performed by the terminal 120 shown in FIG. 1. The method includes the following operations:

Operation 401: Generate an image sequence according to a face image.

In some embodiments, the face image includes an entire face, or the face image includes a part of a face. In some embodiments, the face image includes a plurality of faces.

In some embodiments, the image sequence includes a face image and n local image blocks, the local image blocks are obtained by segmenting the face image, and n is a positive integer.

Operation 402: Generate a feature vector group based on the image sequence.

The feature vector group is generated based on a feature information interaction result between the face image and the local image blocks and a feature information interaction result between the local image blocks. Exemplarily, the feature vector group is outputted by performing data processing on the image sequence through a transformer model.

Operation 403: Take a feature vector corresponding to the face image in the feature vector group as biological feature information of the face image.

In Some embodiments, feature vectors corresponding to the local image blocks in the feature vector group are taken as biological feature information of the face image.

In some embodiments, a feature vector corresponding to the face image and feature vectors corresponding to the local image blocks in the feature vector group are collectively taken as biological feature information of the face image.

Operation 404: Perform data processing on the biological feature information through a first classification network, and output a first prediction score.

The first classification network is used for classifying the biological feature information according to living body information in the biological feature information. Exemplarily, the biological feature information is inputted into a classification network to obtain a first prediction score. The first prediction score belongs to an interval (0, 1).

Operation 405: Determine that a face in the face image is a living body in response to the first prediction score being greater than a first determination threshold.

On the other hand, it is determined that a face in the face image is not a living body in response to the first prediction score being not greater than a first determination threshold.

The first determination threshold is used for determining whether a face in the face image corresponding to the first prediction score is a living body. In some embodiments, a person skilled in the art is to be able to adjust the first determination threshold according to actual needs. For example, the determination threshold is set as 0.5. In an a-th living body detection, a prediction score obtained is 0.6, and it is determined that the face in the face image is a living body according to the prediction score. However, the face in the face image does not actually belong to a living body. In the next b living body detections, the situation that a prediction result does not comply with an actual result continuously occurs. At this moment, those skilled in the art may increase or decrease the determination threshold according to actual situations. For example, the determination threshold is increased from 0.5 to 0.6.

In summary, according to some embodiments, a face image is segmented into several parts, and biological feature information is extracted from the original face image and local image blocks obtained after segmentation, so as to determine whether a face in the face image is a living body. According to the method, global biological feature information is obtained through the face image, local biological feature information is obtained through the local image blocks, global-to-local and local-to-local relationships are introduced, living body detection can be performed from a more comprehensive perspective, and living body detection results obtained can better reflect the actual situations, thereby not only improving the accuracy of living body detection, but also increasing the performance of living body detection.

In the following embodiments, in identity recognition, the description is made with an example that the biological feature image is a fingerprint image. A person skilled in the art is to be aware that the fingerprint image may also be at least one of a face image, a palm print image, an iris image, and a vein image.

Figure 5:
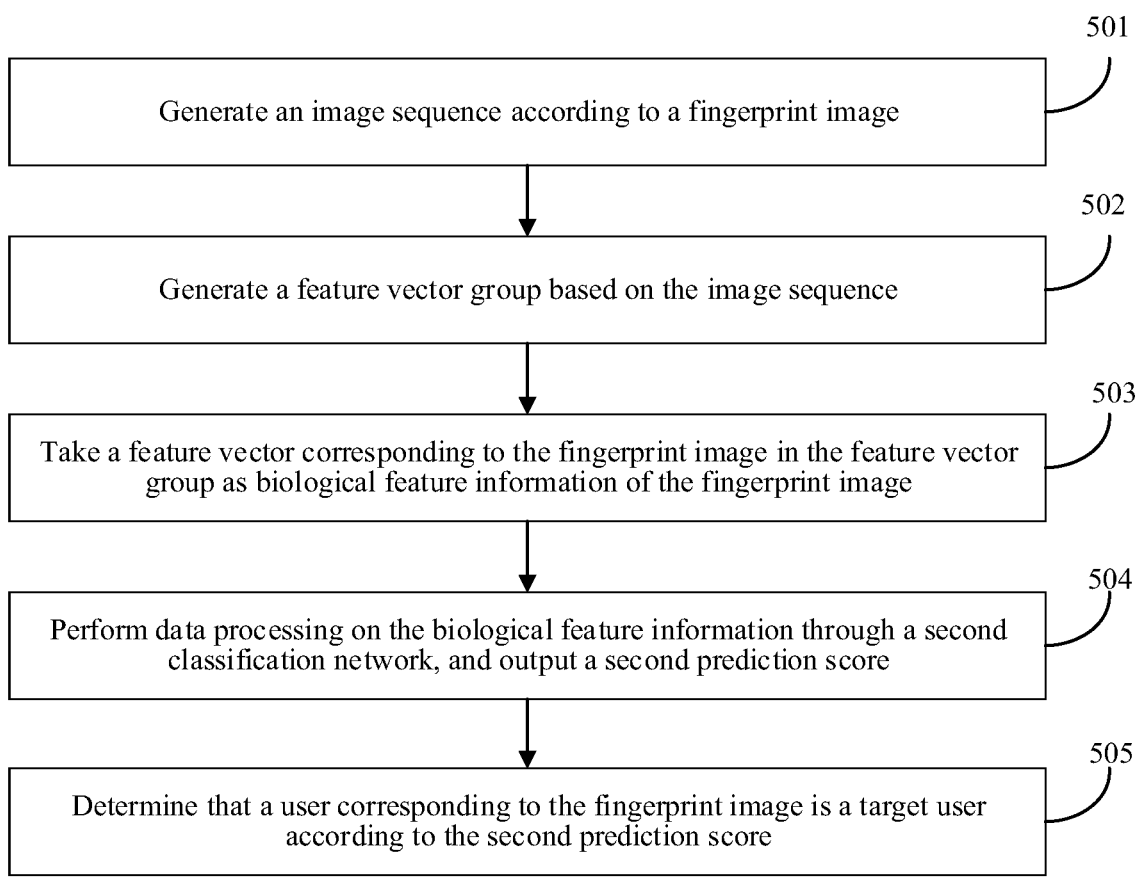
FIG. 5 is a schematic flowchart of an identity recognition method according to some embodiments.

FIG. 5 shows a schematic flowchart of an identity recognition method according to some embodiments. The method may be performed by the terminal 120 shown in FIG. 1. The method includes the following operations:

Operation 501: Generate an image sequence according to a fingerprint image.

In some embodiments, the fingerprint image includes a complete fingerprint, or the fingerprint image includes a part of a fingerprint. In some embodiments, the fingerprint image includes a plurality of fingerprints.

Operation 502: Generate a feature vector group based on the image sequence.

The feature vector group is generated based on a feature information interaction result between the fingerprint image and the local image blocks and a feature information interaction result between the local image blocks. Exemplarily, the feature vector group is outputted by performing data processing on the image sequence through a transformer model.

Operation 503: Take a feature vector corresponding to the biological feature image in the feature vector group as biological feature information of the biological feature image.

In some embodiments, feature vectors corresponding to the local image blocks in the feature vector group are taken as biological feature information of the biological feature image.

In some embodiments, a feature vector corresponding to the biological feature image and feature vectors corresponding to the local image blocks in the feature vector group are collectively taken as biological feature information of the biological feature image.

Operation 504: Perform data processing on the biological feature information through a second classification network, and output a second prediction score.

The second classification network is used for classifying the biological feature information according to identity information in the biological feature information. Exemplarily, the biological feature information is inputted into the second classification network to obtain a second prediction score.

Operation 505: Determine that a user corresponding to the fingerprint image is a target user according to the second prediction score.

In some embodiments, a target user is determined according to a score interval in which the second prediction score is located. Exemplarily, when the second prediction score belongs to a score interval [0, 0.2], the user corresponding to the fingerprint image is considered to be user A. When the second prediction score belongs to a score interval (0.2, 0.5], the user corresponding to the fingerprint image is considered to be user B. When the second prediction score belongs to a score interval (0.5, 1], the user corresponding to the fingerprint image is considered to be user C.

In some embodiments, it is determined that the user corresponding to the fingerprint image is a target user in response to the second prediction score being greater than a second determination threshold. In some embodiments, it is determined that the user corresponding to the fingerprint image is not a target user in response to the second prediction score being not greater than a second determination threshold. The second determination threshold is used for determining whether the user corresponding to the fingerprint image is a target user according to the second prediction score.

In summary, according to some embodiments, a fingerprint image is segmented into several parts, and biological feature information is extracted from the original fingerprint image and local image blocks obtained after segmentation, so as to determine whether a user corresponding to the fingerprint image is a target user. According to the method, global biological feature information is obtained through the fingerprint image, local biological feature information is obtained through the local image blocks, global-to-local and local-to-local relationships are introduced, identity recognition can be performed from a more comprehensive perspective, and identity recognition results obtained can better reflect the actual situations, thereby improving the accuracy of identity recognition.

Figure 6:
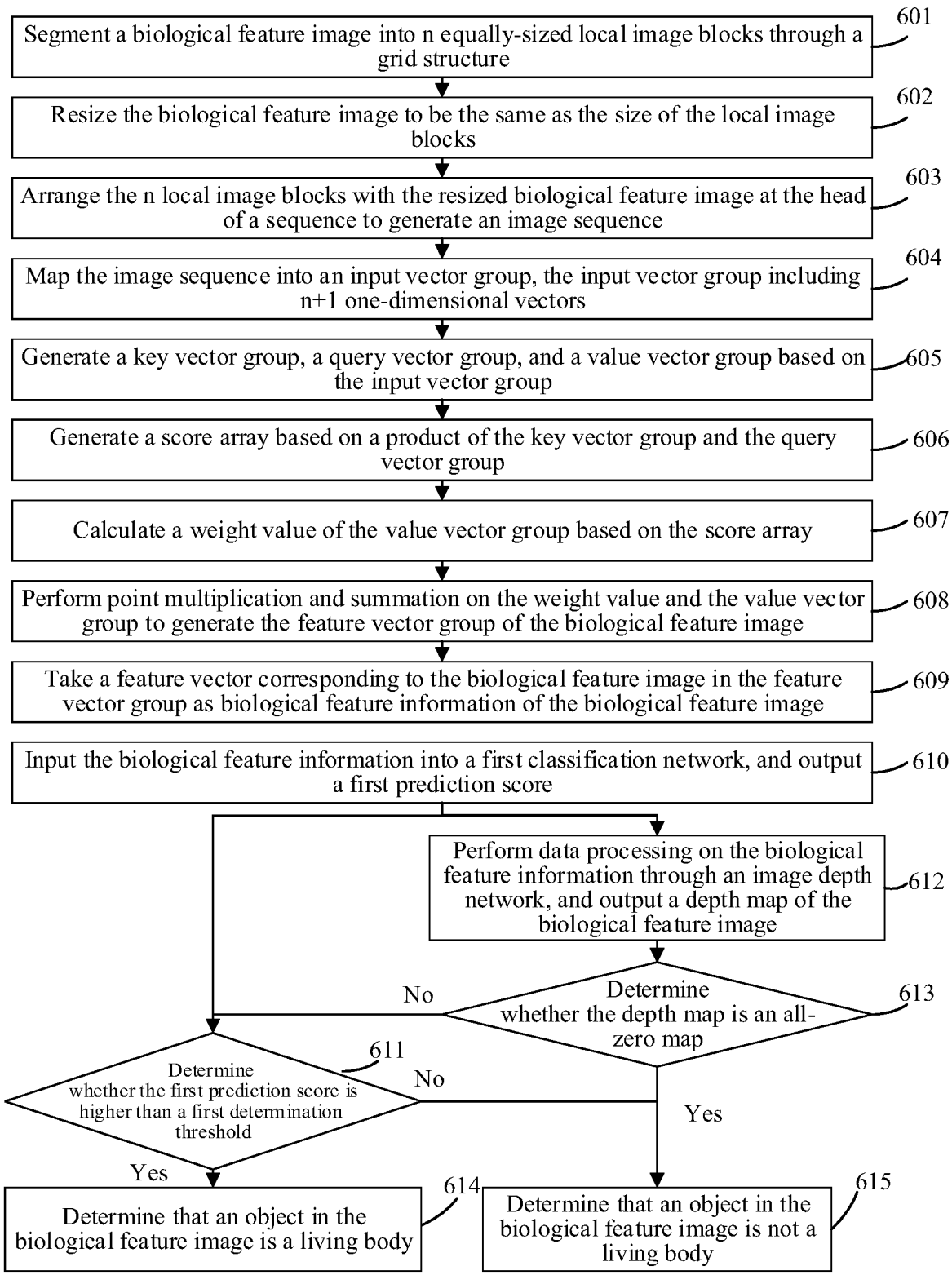
FIG. 6 is a flowchart of an exemplary implementation scenario according to some embodiments.

In some embodiments, a single biological feature image is segmented to obtain local image blocks so as to acquire local feature information in the biological feature image. In some embodiments, different feature information in the biological feature image is assigned with different weight values through an attention mechanism so as to highlight more important feature information. Still, different determination methods are provided for a final use scenario of the biological feature information, thereby not only extracting the biological feature information more quickly, but also obtaining more accurate biological feature information. The specific embodiments are as follows:

FIG. 6 shows a schematic flowchart of a method for extracting biological features according to some embodiments. The method may be performed by the terminal 120 shown in FIG. 1. The method includes the following operations:

Operation 601: Segment a biological feature image into n equally-sized local image blocks through a grid structure.

The biological feature image refers to an image including biological features inherent to a human body. In some embodiments, the biological feature image includes at least one of a face image, a fingerprint image, a palm print image, an iris image, and a vein image.

In some embodiments, a complete biological feature image may be obtained by stitching the obtained n equally-sized local image blocks.

In some embodiments, the obtained n equally-sized local image blocks have repeated parts, and thus a complete biological feature image cannot be obtained by stitching. Exemplarily, a biological feature image with a size of 3*3 is segmented, and four 2*2 local image blocks are obtained. The four 2*2 biological feature images have repeated parts, and a complete biological feature image cannot be obtained by stitching.

In some embodiments, the obtained n equally-sized local image blocks do not have repeated parts, and a complete biological feature image cannot be obtained by stitching. Exemplarily, a biological feature image with a size of 2*2 is segmented, and four 1*1 local image blocks are obtained. The four local image blocks do not have repeated parts, and a complete biological feature image may be obtained by stitching the four local image blocks. Three of the local image blocks are taken as local image blocks to be used in the next operation.

Figure 7:
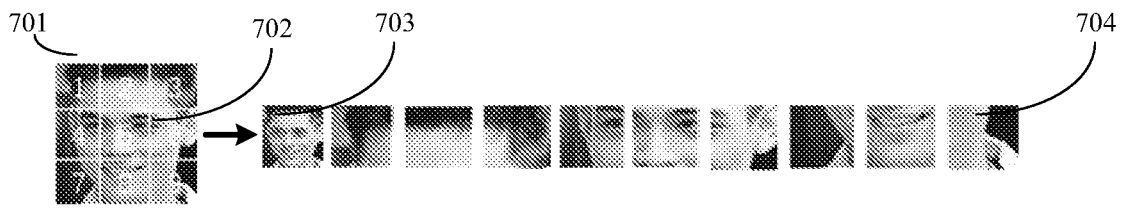
FIG. 7 is a schematic diagram of generation of an image sequence according to some embodiments.

As shown in FIG. 7, a biological feature image 701 is segmented into nine equally-sized local image blocks 702 by a 3*3 grid, a complete biological feature image 701 may be obtained by stitching the nine local image blocks, and the nine local image blocks do not have repeated parts.

Operation 602: Resize the biological feature image to be the same as the size of the local image blocks.

In some embodiments, the biological feature image is resized to be the same as the size of the local image blocks through image interpolation.

In some embodiments, the biological feature image is resized to be the same as the size of the local image blocks through down-sampling.

In some embodiments, the size of the biological feature image is 126*126, the size of the local image blocks obtained by segmentation through the 3*3 grid is 42*42, and then the size of the biological feature image is reduced to 42*42 through down-sampling.

In some embodiments, the local image blocks are resized to be the same as the size of the biological feature image. For example, the local image blocks are resized to be the same as the size of the biological feature image through up-sampling, or, the local image blocks are resized to be the same as the size of the biological feature image through image interpolation. Exemplarily, the size of the biological feature image is 126*126, the size of the local image blocks obtained by segmentation through the 3*3 grid is 42*42, and then the size of the biological feature image is increased to 126*126 through up-sampling.

Exemplarily, as shown in FIG. 7, the size of the biological feature image 701 is reduced to be the same as the size of the local image blocks 702, so as to obtain a biological feature image 703.

Operation 603: Arrange the n local image blocks with the resized biological feature image at the head of a sequence to generate an image sequence.

The biological feature image may be provided at other positions in the image sequence in addition to being provided at the head of the image sequence.

In some embodiments, the biological feature image and the n local image blocks are arranged in a random order. Exemplarily, it is assumed that there are local image block 1, local image block 2, local image block 3, and local image block 4. An image sequence is generated by randomly arranging local image block 3, local image block 1, the biological feature image, local image block 4, local image block 1, and local image block 2 in this order.

In some embodiments, the n local image blocks are arranged in the order of the biological feature image from left to right and from up to down, and then the biological feature image is inserted into the image sequence as the tail of the sequence.

In some embodiments, the n local image blocks are arranged in the order of the biological feature image from left to right and from up to down, and then the biological feature image is randomly inserted into the image sequence.

Exemplarily, as shown in FIG. 7, the local image blocks 702 are arranged from left to right and from up to down, and the biological feature image 703 is inserted into an image sequence 704 as the head of the sequence.

Operation 604: Map the image sequence into an input vector group, the input vector group including n+1 one-dimensional vectors.

In some embodiments, the image sequence is mapped into the input vector group through a linear mapping network.

In some embodiments, the image sequence is mapped into the input vector group through an encoder.

Figure 8:
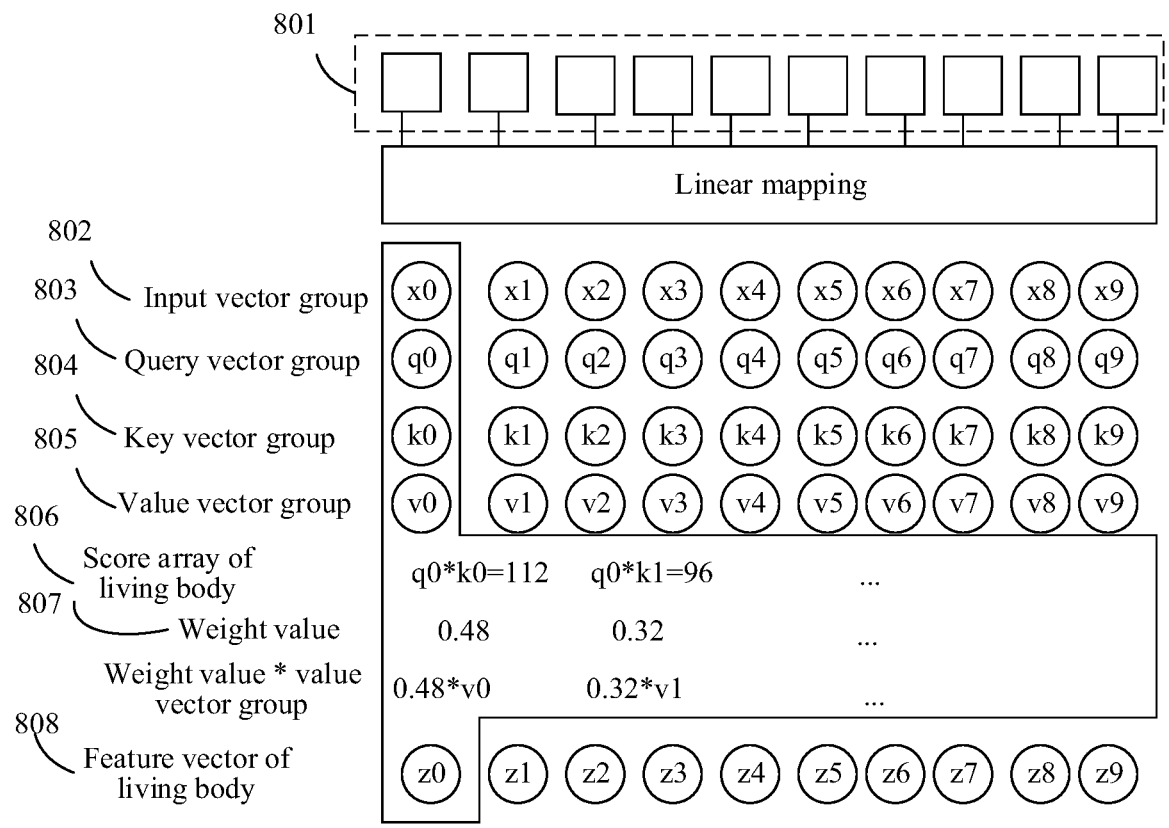
FIG. 8 is a schematic diagram of an exemplary encoder model according to some embodiments.

Exemplarily, as shown in FIG. 8, an image sequence 801 has a length of 10. It is assumed that an input shape of the image sequence 801 is 10*3*16*16 (number of images*number of channels*length*width). A two-dimensional image in the image sequence 801 is mapped to x0, x1, ..., x9 in an input vector group 802 of 10*768 by linear mapping. A one-dimensional vector corresponding to the biological feature image is x0.

Operation 605: Generate a key vector group, a query vector group, and a value vector group based on the input vector group.

The key vector group is calculated based on a product of the input vector group and a key matrix (abbreviated as K matrix).

The query vector group is calculated based on a product of the input vector group and a query matrix (abbreviated as Q matrix).

The value vector group is calculated based on a product of the input vector group and a Value matrix (abbreviated as V matrix).

The key matrix, the query matrix, and the value matrix are all obtained by training an encoder model.

Exemplarily, as shown in FIG. 8, the query matrix is sequentially multiplied by x0, x1, ..., x9 in the input vector group 802 to obtain q0, q1, ..., q9 in a key vector group 803. The query matrix has a size of 512*768. The key matrix is sequentially multiplied by x0, x1, ..., x9 in the input vector group 802 to obtain k0, k1, ..., k9 in a query vector group 804. The key matrix has a size of 512*768. The value matrix is sequentially multiplied by x0, x1, . . . , x9 in the input vector group 802 to obtain v0, v1, . . . , v9 in a value vector group 805. The value matrix has a size of 512*768.

Operation 606: Generate a score array based on a product of the key vector group and the query vector group.

The score array is obtained based on the product of the key vector group and the query vector group, and includes global feature information and local feature information in the biological feature image.

In some embodiments, a score array is generated by multiplying a target key vector in the key vector group and all query vectors in the query vector group two by two. The target key vector is a key vector corresponding to the biological feature image. Exemplarily, a score array s0, . . . , s5 is generated by multiplying a target key vector k1 in the key vector group and q1, . . . , q5 in the query vector group two by two.

Exemplarily, as shown in FIG. 8, vectors in the query vector group 803 and vectors in the key vector group 804 are multiplied two by two to obtain a score array 806 (Score). For example, q0*k0=112, q0*k0=96.

Operation 607: Calculate a weight value of the value vector group based on the score array.

The process of calculating the weight value includes the following two sub-operations:

1. Normalize the score array according to a dimension of a one-dimensional vector in the input vector group.

The one-dimensional vector is a vector in the above input vector group.

This normalization is used for stabilizing the gradient, thereby preventing excessive or insufficient convergence of the results.

Exemplarily, if a one-dimensional vector in the input vector group is represented as 10*768, a dimension of the one-dimensional vector is 768. When normalizing, a score in the score array is divided by the square of the dimension. For example, if one of the scores in the score array is 98, the score is normalized to $98\sqrt{768}$.

Exemplarily, a normalized score array is score1=score/$\sqrt{d_k}$. $d_k$ is the dimension of a one-dimensional vector, score is a score array, and in the corresponding example of FIG. 8, $d_k$=768.

2. Perform exponential normalization on the normalized score array, and calculate the weight value.

In some embodiments, exponential normalization is performed by using a softmax function.

Exemplarily, as shown in FIG. 8, a softmax activation function is used for a score array 806, a weight value 807 obtained is denoted as $score_i$, and then $score_i = e^{score_i}/\sum_{j=1}^{10} e^{score_j}$.

Operation 608: Perform point multiplication and summation on the weight value and the value vector group to generate the feature vector group of the biological feature image.

In some embodiments, point multiplication is performed on the weight value and the corresponding value vectors in the value vector group one by one, and all products obtained after the point multiplication are summed, so as to generate the feature vector group of the biological feature image.

Exemplarily, as shown in FIG. 8, a feature vector group 808 is denoted as z, and then $z = \sum_{i=1}^{10} Value_i$, where $Value_i = Value \cdot score_i$, Value is a value vector group, and $score_i$ is the above weight value.

Operation 609: Take a feature vector corresponding to the biological feature image in the feature vector group as biological feature information of the biological feature image.

Exemplarily, as shown in FIG. 8, a feature vector corresponding to the biological feature image in the feature vector group 808 is taken as biological feature information z0 of the biological feature image.

In some embodiments, feature vectors corresponding to the local image blocks in the feature vector group are taken as biological feature information of the biological feature image.

In some embodiments, a feature vector corresponding to the biological feature image and feature vectors corresponding to the local image blocks in the feature vector group are collectively taken as biological feature information of the biological feature image.

Operation 610: Input the biological feature information into a first classification network, and output a first prediction score.

The first classification network is used for classifying the biological feature information according to living body information in the biological feature information. Exemplarily, the obtained biological feature information is z1, and a first prediction score is outputted as 0.6 via a classification network.

In some embodiments, the first prediction score has a value range. Exemplarily, the outputted first prediction score belongs to an interval (0, 1).

Operation 611: Determine whether the first prediction score is greater than a first determination threshold.

If the first prediction score is greater than the first determination threshold, operation 614 is performed.

If the first prediction score is not greater than the first determination threshold, operation 615 is performed.

Operation 612: Perform data processing on the biological feature information through an image depth network, and output a depth map of the biological feature image.

The image depth network is used for generating the depth map according to the input biological feature information. Exemplarily, the biological feature information is inputted into the image depth network, and the image depth network extracts depth information therein and outputs a depth map of the biological feature image.

Operation 613: Determine whether the depth map is an all-zero map.

If the depth map is an all-zero map, operation 615 is performed.

If the depth map is not an all-zero map, operation 611 is performed.

When an object in a biological feature image does not belong to a living body, the object may be obtained by at least one of common attacks such as photos, face changing, masks, occlusions, and screen re-shooting, and image depths in the biological feature image obtained by the above attacks are all zero. Therefore, when the outputted depth map is an all-zero map, the object in the corresponding biological feature image is not a living body.

Operation 614: Determine that an object in the biological feature image is a living body.

In some embodiments, this result is obtained by the above operations 610 and 611, and may also be obtained by the above operations 610, 612, 613, and 611. This is not specifically limited herein.

Operation 615: Determine that an object in the biological feature image is not a living body.

In some embodiments, this result is obtained by the above operations 610 and 611, may also be obtained by the above operations 610, 612, and 613, and may also be obtained by the above operations 610, 612, 613, and 611. This is not specifically limited herein.

In some embodiments, in living body detection for faces, when the biological feature image includes a plurality of faces, it is sequentially determined whether the faces in the biological feature image are living bodies. Exemplarily, the biological feature image includes face 1, face 2, and face 3, and it is sequentially determined that face 1 is a living body, face 2 is a living body, and face 3 is not a living body.

In summary, according to some embodiments, an inputted biological feature image is segmented into several parts, and a living body feature vector is extracted from the original biological feature image and local image blocks obtained after segmentation, so as to determine whether an object in the biological feature image is a living body. According to the method, global living body feature information is obtained through the biological feature image, local living body feature information is obtained through the local image blocks, global-to-local and local-to-local relationships are introduced, living body detection can be performed from a more comprehensive perspective, and living body detection results obtained can better reflect the actual situations, thereby not only improving the accuracy of living body detection, but also increasing the performance of living body detection.

Since the inputted biological feature image includes enough original living body feature information, a good feature basis is provided for living body detection, and the combination of the method with other models is facilitated to obtain more detailed detection results. In addition, some embodiments introduces a framework transformer model in natural language processing to extract relationships between different local image blocks in an image sequence. These relationships include both a relationship between a local image and a local image and a relationship between a local image and a global image. Finally, the output of a corresponding position of a scaled biological feature image is taken as a living body feature vector of the biological feature image, which is then input into a subsequent classification network for determination. Meanwhile, a depth map constraint is imposed on corresponding features of the original biological feature image, thereby ensuring that the features can contain enough original living body feature information without being only collapsed to some fixed values. The input of the transformer model needs not only local image blocks, but also a complete biological feature image. Therefore, the model may extract living body features from different dimensions, thereby providing a better feature basis for subsequent tasks. Meanwhile, on the basis of the whole process, the input may be further adjusted to increase the reliability of the model.

When the transformer model is used for processing natural languages, the transformer model processes the relevance between different texts, and realizes natural language understanding through the relevance between different texts, which can only achieve local-to-local association. However, in some embodiments, the transformer model not only processes the relationship between the biological feature image and the local image blocks, but also processes the relationship between the local image blocks, and can realize local-to-global and local-to-local associations.

Figure 9:
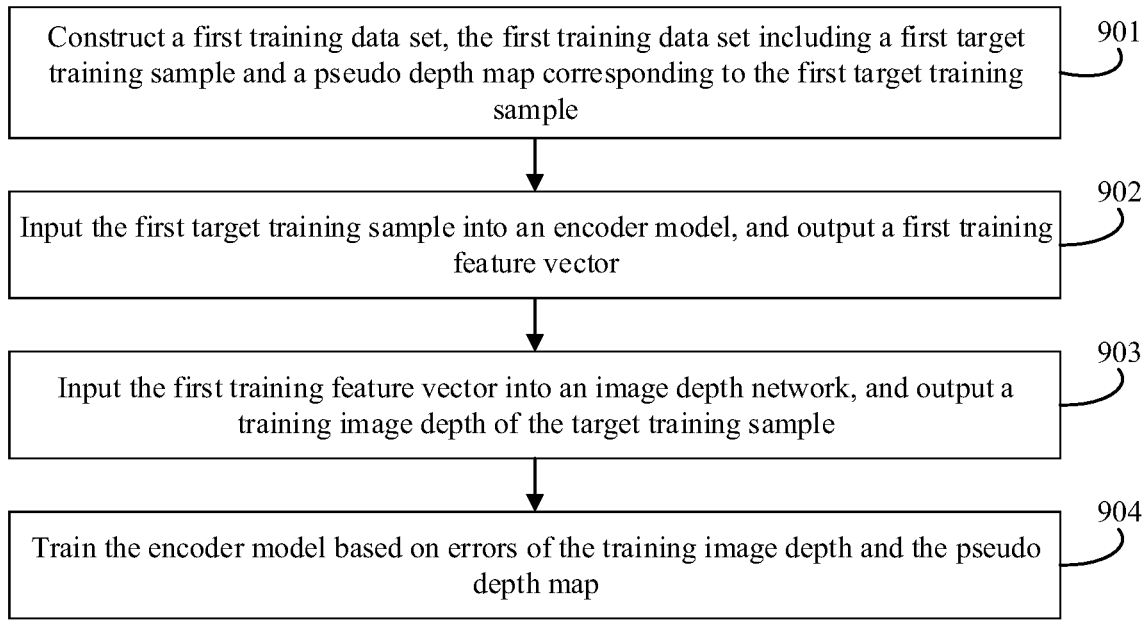
FIG. 9 is a schematic flowchart of an encoder model training method according to some embodiments.

FIG. 9 shows a schematic flowchart of an encoder model training method according to some embodiments. The method may be performed by the server 140 shown in FIG. 1 or other computer devices. The method includes the following operations:

Operation 901: Construct a first training data set, the first training data set including a first target training sample and a pseudo depth map corresponding to the first target training sample.

The first training data set includes a plurality of biological feature images, and the first target training sample is any one of the biological feature images in the first training data set. Exemplarily, biological feature image 1 in the first training data set is taken as a target training sample.

The biological feature image refers to an image including biological features inherent to a human body. In some embodiments, the biological feature image includes at least one of a face image, a fingerprint image, a palm print image, an iris image, and a vein image.

The pseudo depth map is an image that takes a distance (depth) from an image collector to each point in a scenario as a pixel value, and may reflect a geometrical shape of an object surface.

Operation 902: Input the first target training sample into an encoder model, and output a first training feature vector.

In some embodiments, when the first target training sample is inputted to the encoder model, the order of the local image blocks of the first target training sample in the inputted image sequence is randomly adjusted to generate an adjusted image sequence. The method can augment training data of a model and ensure that the training model adapts to more different scenarios. Furthermore, for feature vectors generated from different image sequences, the consistency of model training is ensured by constraining the features of the same local blocks to be similar enough.

Operation 903: Input the first training feature vector into an image depth network, and output a training image depth of the target training sample.

The image depth network may output an image depth of a biological feature image. Exemplarily, biological feature image 1 is inputted, and a depth map of biological feature image 1 is outputted by the image depth network.

In some embodiments, the pseudo depth map corresponding to the target training sample is taken as a correct label, the all-zero map is taken as a wrong label, and the maps are inputted into the image depth network. When biological feature information is extracted, it is necessary to determine whether there is an organism in the biological feature image. When an object in a biological feature image does not belong to a living body, the object may be obtained by at least one of common means such as photos, face changing, masks, occlusions, and screen re-shooting, and image depths in the biological feature image obtained by the above means are all zero. Therefore, when the outputted depth map is an all-zero map, the object in the corresponding biological feature image is not a living body.

Operation 904: Train the encoder model based on errors of the training image depth and the pseudo depth map.

In some embodiments, a depth loss is obtained by forward calculation through mini-batch (a method for calculating gradient descent), a batch gradient descent (BGD) optimization algorithm is adopted, and the encoder model is updated.

Exemplarily, the encoder model is trained with the pseudo depth map as a depth label of a living body and the all-zero map as a depth label of a non-living body. The all-zero map represents that all pixel values in an image are 0, and in other words, the all-zero map appears as a black image.

In some embodiments, the encoder model is trained by calculating errors of the training image depth and the pseudo depth map through a loss function.

Exemplarily, the loss function is denoted as $l_{depth}$, and then:

$$l_{depth}=E_{x\sim(img)}\|Dep(\text{transformer}(x))-dep_x\|_1,$$

where img is a target training sample, $dep_x$ is a pseudo depth map, $Dep(\text{transformer}(x))$ represents an output depth, and $E_{x\sim(img)}$ represents iterative multiplication.

In summary, the encoder model can learn discriminative parts from the features of image blocks of different classes and different domains simultaneously, thereby ensuring that the encoder model can learn sufficiently robust features with mobility. Furthermore, the method provided in some embodiments can better model global-to-local and local-to-local relationships, thereby not only improving the accuracy of classification, but also increasing the performance of generalization. Meanwhile, for a new attack type, the network can also be used for extracting distribution differences between the attack type and real samples to a certain extent. The network has a certain cross-domain generalization performance. In addition, the obtained model does not require user interaction and is less time consuming when applied, thereby improving user experience. Furthermore, the model can learn discriminative parts from the features of local image blocks of different classes and different domains simultaneously, thereby greatly increasing the learning difficulty of the model and ensuring that the model can learn sufficiently robust features.

Figure 10:
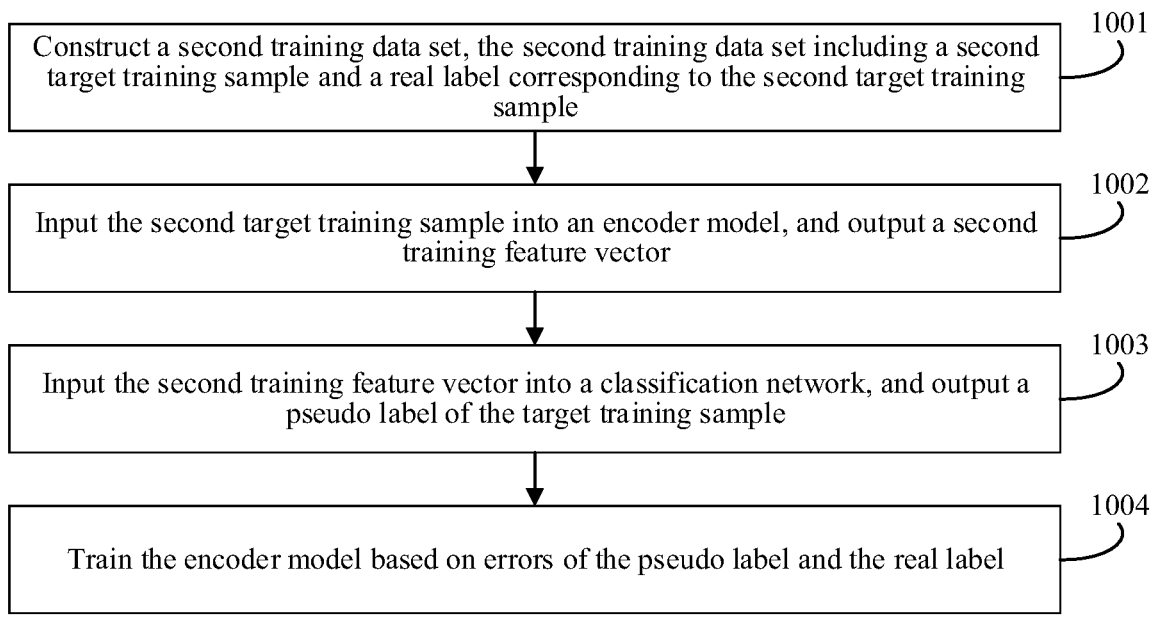
FIG. 10 is a schematic flowchart of an encoder model training method according to some embodiments.

FIG. 10 shows a schematic flowchart of an encoder model training method according to some embodiments. The method may be performed by the server 140 shown in FIG. 1 or other computer devices. The method includes the following operations:

Operation 1001: Construct a second training data set, the second training data set including a second target training sample and a real label corresponding to the second target training sample.

The training data set includes a plurality of biological feature images, and the target training sample is any one of the biological feature images in the training data. Exemplarily, biological feature image 1 in the training data set is taken as a target training sample.

The biological feature image refers to an image including biological features inherent to a human body. In some embodiments, the biological feature image includes at least one of a face image, a fingerprint image, a palm print image, an iris image, and a vein image.

Operation 1002: Input the second target training sample into an encoder model, and output a second training feature vector.

In some embodiments, when the second target training sample is inputted to the encoder model, the order of the local image blocks of the second target training sample in the inputted image sequence is randomly adjusted to generate an adjusted image sequence. The method can augment training data of a model and ensure that the training model adapts to more different scenarios. Furthermore, for feature vectors generated from different image sequences, the consistency of model training is ensured by constraining the features of the same local blocks to be similar enough.

Operation 1003: Input the second training feature vector into a classification network, and output a pseudo label of the target training sample.

The pseudo label refers to a label of a living body detection result outputted by the encoder model through the target training sample. The pseudo label is the prediction of the target training sample, and the pseudo label is not necessarily correct. In contrast to the pseudo label, a real label represents a real situation of the target training sample.

Exemplarily, after the target training sample passes through the above model and network, the output is "yes", and the generated pseudo label represents that an object in the biological feature image is a living body.

Operation 1004: Train the encoder model based on errors of the pseudo label and the real label.

In some embodiments, a classification loss is obtained by forward calculation through mini-batch (a method for calculating gradient descent), a batch gradient descent (BGD) optimization algorithm is adopted, and the encoder model is updated.

In some embodiments, the encoder model is trained by calculating errors of the pseudo label and the real label through a loss function.

Exemplarily, the loss function is denoted as $l_{depth}$, and then:

$$l_{classifier}=-\Sigma_{i=1}^{N}y_i\log(\text{softmax}(\text{Classifier}(\text{transformer}(x_i)))),$$

where $x_i$ is a target training sample, $y_i$ is a real label corresponding to the target training sample $x_i$, softmax( ) is an exponential normalization function, transformer( ) represents an encoder model, Classifier( ) represents an image classification network, and log( ) represents a logarithmic operation.

In summary, the encoder model can learn discriminative parts from the features of images of different classes and different domains simultaneously, thereby ensuring that the encoder model can learn sufficiently robust features with mobility. Furthermore, the method provided in some embodiments can better model global-to-local and local-to-local relationships, thereby not only improving the accuracy of classification, but also increasing the performance of generalization.

Meanwhile, for a new attack type, the model can also be used for extracting distribution differences between the attack type and real samples to a certain extent. The model has a certain cross-domain generalization performance. In addition, the obtained model does not require user interaction and is less time consuming when applied, thereby improving user experience. Furthermore, the model can learn discriminative parts from the features of local image blocks of different classes and different domains simultaneously, thereby greatly increasing the learning difficulty of the model and ensuring that the model can learn sufficiently robust features.

Still, a transformer model is used for extracting relationships between different local image blocks in an image sequence and a biological feature image. These relationships include both a relationship between a local image and a local image and a relationship between a local image and a global image. Finally, the output of a corresponding position of the scaled original biological feature image is taken as a living body feature vector of the biological feature image, which is then input into a subsequent classification network for determination. Meanwhile, a depth map constraint is imposed on corresponding features of the original biological feature image, thereby ensuring that the features can contain enough original information without being only collapsed to some fixed values.

Figure 11:
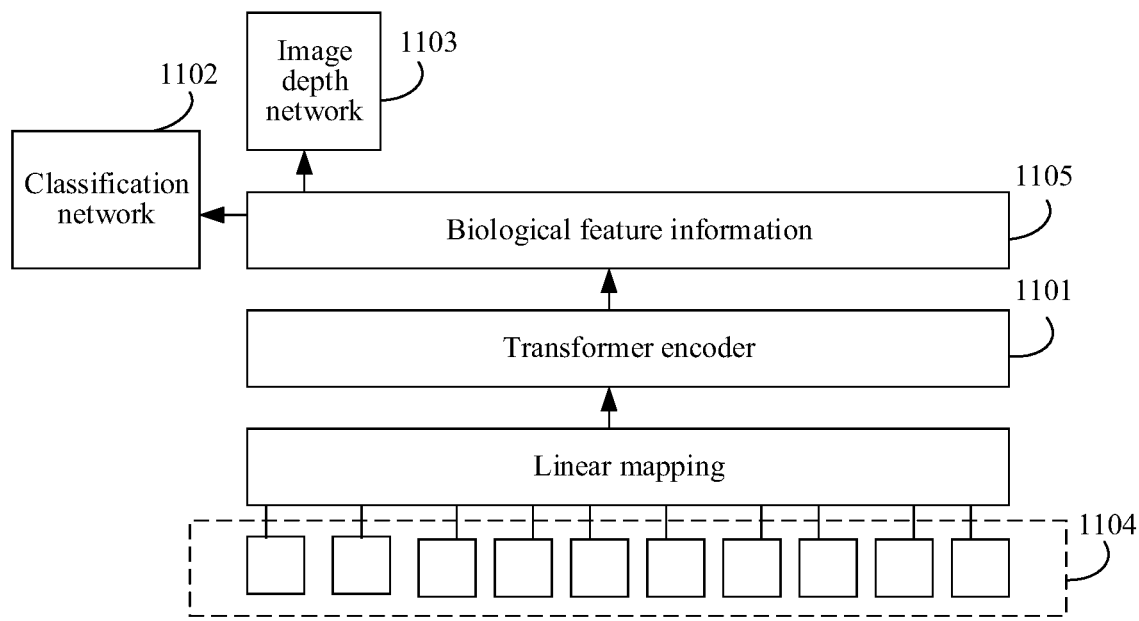
FIG. 11 is a schematic diagram of an encoder model according to some embodiments.

FIG. 11 shows a schematic model diagram of an encoder model according to some embodiments. The encoder model includes a Transformer encoder 1101, a classification network 1102, and an image depth network 1103.

The input of the Transformer encoder 1101 is an input vector group. The input vector group is obtained by linearly mapping a picture sequence 1104. The output of the Transformer encoder 1101 is biological feature information 1105.

The biological feature information 1105 is transmitted into the classification network 1102, a prediction result is outputted, and it is determined whether an object in a biological feature image is a living body based on a relationship between the prediction result and a determination threshold.

The image depth network 1103 is only used in a training process of the encoder model, the input of the image depth network 1103 is also the biological feature information 1105, and the output is an image depth.

In summary, the Transformer encoder can learn discriminative parts from the features of image blocks of different classes and different domains simultaneously, thereby ensuring that the encoder model can learn sufficiently robust features with mobility. Furthermore, the method provided in some embodiments can better model global-to-local and local-to-local relationships, thereby not only improving the accuracy of classification, but also increasing the performance of generalization. Meanwhile, for a new attack type, the network can also be used for extracting distribution differences between the attack type and real samples to a certain extent. The network has a certain cross-domain generalization performance. In addition, the obtained model does not require user interaction and is less time consuming when applied, thereby improving user experience. Furthermore, the model can learn discriminative parts from the features of local image blocks of different classes and different domains simultaneously, thereby greatly increasing the learning difficulty of the model and ensuring that the model can learn sufficiently robust features.

Living body detection has a wide range of applications in modern society, and in the actual use, the living body detection will be used in combination with other technologies, such as face identity verification, remote identity verification by banks, face payment, remote authentication by online car-hailing drivers, and community access control system. Moreover, as the first line of defense, the living body detection will control the important links of authentication security. Therefore, an application scenario of living body detection is briefly introduced, as shown below.

Figure 12:
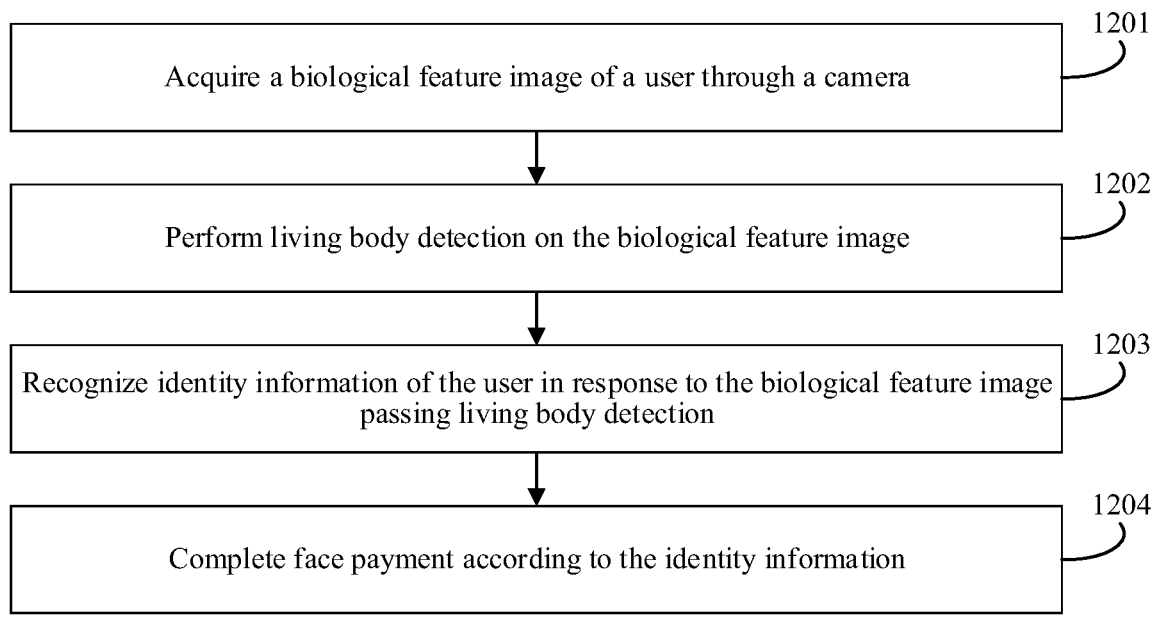
FIG. 12 is a flowchart of an exemplary implementation scenario according to some embodiments.

FIG. 12 shows a flowchart of an implementation scenario according to some embodiments. The scenario is a face payment scenario, including the following operations:

Operation 1201: Acquire a biological feature image of a user through a camera.

A terminal acquires a biological feature image of a user through a camera.

In some embodiments, the biological feature image refers to an image including a human face. In some embodiments, the biological feature image includes an entire face, or the biological feature image includes a part of a face. In some embodiments, the biological feature image includes a plurality of faces.

In some embodiments, the biological feature image of the user may also be obtained by accessing a local storage space, or obtained by transmitting from other terminals, or obtained by downloading from the Internet.

Operation 1202: Perform living body detection on the biological feature image.

Living body detection is performed on the biological feature image through a living body detection method provided in some embodiments.

Specifically, this operation includes the following sub-operations:

1. Generate an image sequence according to the biological feature image.

The description is made with an example that the biological feature image includes a face. At this moment, the biological feature image refers to an image including a human face. In some embodiments, the biological feature image includes an entire face, or the biological feature image includes a part of a face. In some embodiments, the biological feature image includes a plurality of faces.

2. Generate a feature vector group based on the image sequence.

A feature vector of a target living body is generated based on a feature information interaction result between the biological feature image and local image blocks and a feature information interaction result between the local image blocks. Specifically, the biological feature image mainly carries global feature information, while the local image blocks mainly carry local feature information. In the process of generating a feature vector group, both an interaction between the global feature information and the local feature information and an interaction between the local feature information are present, whereby the outputted feature vector group includes complete feature information in the biological feature image, and biological feature information can be better extracted.

3. Take a feature vector corresponding to the biological feature image in the feature vector group as biological feature information of the biological feature image.

In some embodiments, the biological feature information is used for realizing living body detection.

4. Determine that an object in the biological feature image is a living body according to the biological feature information.

In some embodiments, the biological feature information is inputted into a classification network to obtain a first prediction score. The classification network is used for classifying the biological feature information according to living body information in the biological feature information. Exemplarily, the biological feature information is inputted into a classification network to obtain a first prediction score. The first prediction score belongs to an interval (0, 1).

On the one hand, it is determined that an object in the biological feature image is a living body in response to the first prediction score being greater than a determination threshold. On the other hand, it is determined that an object in the biological feature image is not a living body in response to the prediction score being not greater than a determination threshold.

The determination threshold is used for determining whether an object in the biological feature image corresponding to the current prediction score is a living body. In some embodiments, a person skilled in the art is to be able to adjust the determination threshold according to actual needs.

Operation 1203: Recognize identity information of the user in response to the biological feature image passing living body detection.

Identity information of the user is recognized in response to the biological feature image passing living body detection.

The biological feature image is confirmed as a malicious attack in response to the biological feature image not passing living body detection. A server may issue a corresponding instruction according to the confirmation result, for example, at least one of giving an alarm, reacquiring a biological feature image, and performing living body detection on a next biological feature image.

Operation 1204: Complete face payment according to the identity information.

The terminal completes face payment according to the identity information.

In some embodiments, an account is created for the user in response to not recognizing the identity information of the user.

In summary, the method provided in some embodiments may be applied to face payment, and living body detection is an important link for controlling payment security. The living body detection method of some embodiments can reject some illegal attacks on transactions attempted, thereby ensuring the security of transactions, and ensuring that the interests of companies and individuals are not damaged. Meanwhile, living body detection can be performed from a more comprehensive perspective, and living body detection results obtained can better reflect the actual situations, thereby not only improving the accuracy of living body detection, but also increasing the performance of living body detection.

Figure 13:
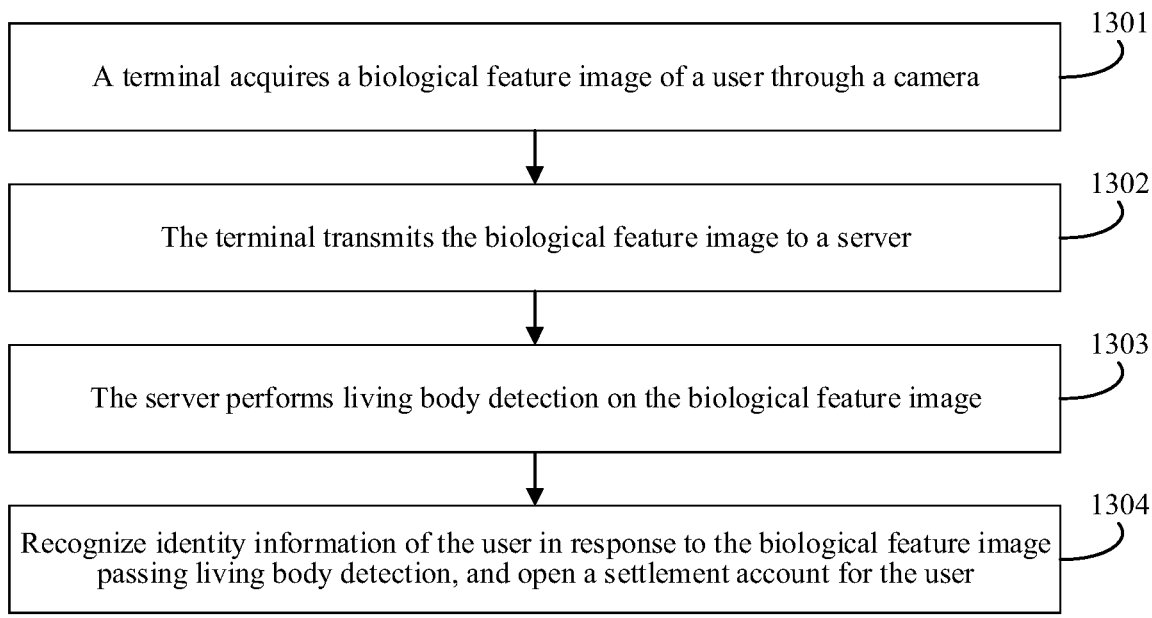
FIG. 13 is a flowchart of an exemplary implementation scenario according to some embodiments.

FIG. 13 shows a flowchart of an exemplary implementation scenario according to some embodiments. The scenario is a scenario of remotely opening a bank account, including the following operations:

Operation 1301: A terminal acquires a biological feature image of a user through a camera.

In some embodiments, the biological feature image refers to an image including a human face. In some embodiments, the biological feature image includes an entire face, or the biological feature image includes a part of a face. In some embodiments, the biological feature image includes a plurality of faces.

In some embodiments, the biological feature image of the user may also be obtained by accessing a local storage space, or obtained by transmitting from other terminals, or obtained by downloading from the Internet.

Operation 1302: The terminal transmits the biological feature image to a server.

In some embodiments, the terminal transmits the biological feature image to the server through at least one of 2G (2nd-Generation mobile communication technology), 3G (3rd-Generation mobile communication technology), 4G (4th-Generation mobile communication technology), or other communication technologies.

Operation 1303: The server performs living body detection on the biological feature image.

The server performs living body detection on the biological feature image through a living body detection method provided in some embodiments.

Specifically, this operation includes the following sub-operations:

1. Generate an image sequence according to the biological feature image.

The description is made with an example that the biological feature image includes a face. At this moment, the biological feature image refers to an image including a human face. In some embodiments, the biological feature image includes an entire face, or the biological feature image includes a part of a face. In some embodiments, the biological feature image includes a plurality of faces.

2. Generate a feature vector group based on the image sequence.

A feature vector of a target living body is generated based on a feature information interaction result between the biological feature image and local image blocks and a feature information interaction result between the local image blocks. Specifically, the biological feature image mainly carries global feature information, while the local image blocks mainly carry local feature information. In the process of generating a feature vector group, both an interaction between the global feature information and the local feature information and an interaction between the local feature information are present, whereby the outputted feature vector group includes complete feature information in the biological feature image, and biological feature information can be better extracted.

3. Take a feature vector corresponding to the biological feature image in the feature vector group as biological feature information of the biological feature image.

In some embodiments, the biological feature information is used for realizing living body detection.

4. Determine that an object in the biological feature image is a living body according to the biological feature information.

In some embodiments, the biological feature information is inputted into a classification network to obtain a first prediction score. The classification network is used for classifying the biological feature information according to living body information in the biological feature information. Exemplarily, the biological feature information is inputted into a classification network to obtain a first prediction score. The first prediction score belongs to an interval (0, 1).

On the one hand, it is determined that an object in the biological feature image is a living body in response to the first prediction score being greater than a determination threshold. On the other hand, it is determined that an object in the biological feature image is not a living body in response to the prediction score being not greater than a determination threshold.

The determination threshold is used for determining whether an object in the biological feature image corresponding to the current prediction score is a living body. In some embodiments, a person skilled in the art is to be able to adjust the determination threshold according to actual needs.

Operation 1304: Recognize identity information of the user in response to the biological feature image passing living body detection, and open a settlement account for the user.

A bank server recognizes identity information of the user in response to the biological feature image passing living body detection, and opens a settlement account for the user.

The biological feature image is confirmed as a malicious attack in response to the biological feature image not passing living body detection. The bank server may issue a corresponding instruction according to the confirmation result, for example, at least one of giving an alarm, reacquiring a biological feature image, and performing living body detection on a next biological feature image.

In some embodiments, an account is created for the user in response to not recognizing the identity information of the user.

In summary, the method provided in some embodiments may be applied to remote bank account opening, and living body detection is an important link for controlling property security. The living body detection method provided in some embodiments can reject some illegal attacks on transactions attempted, thereby ensuring the security of transactions, and ensuring that the interests of companies and individuals are not damaged. Meanwhile, living body detection can be performed from a more comprehensive perspective, and living body detection results obtained can better reflect the actual situations, thereby not only improving the accuracy of living body detection, but also increasing the performance of living body detection.

The following is an apparatus provided in some embodiments. For details not described in detail in the apparatus embodiment, reference may be made to corresponding record in the foregoing method embodiments. Details are not described herein again.

Figure 14:
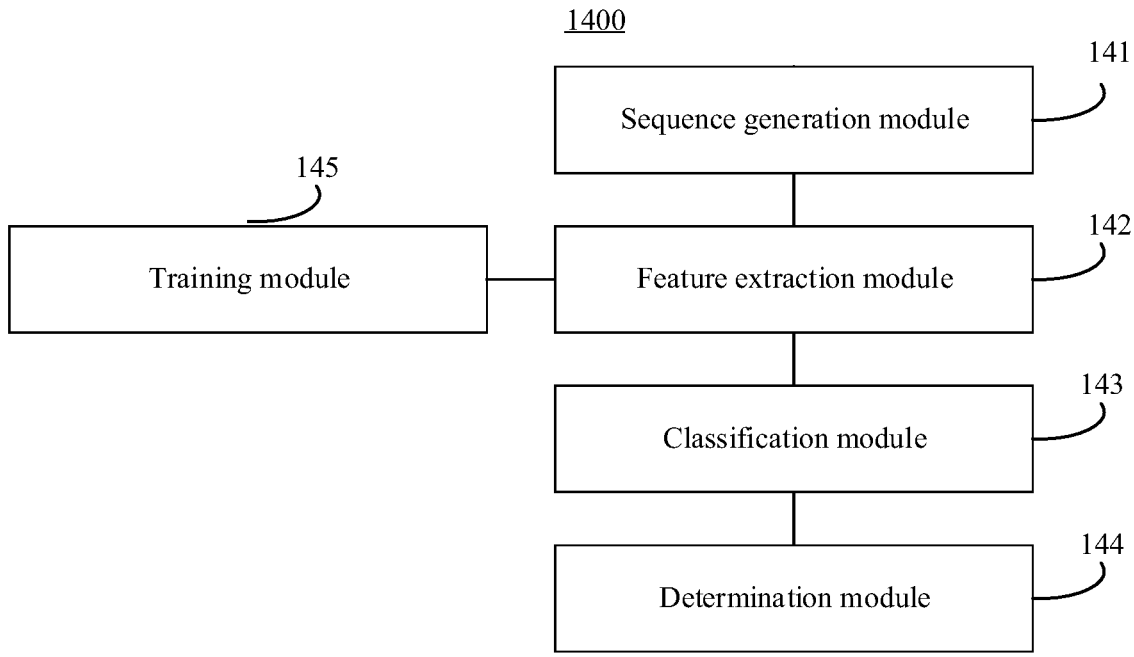
FIG. 14 is a schematic diagram of an apparatus for extracting biological features according to some embodiments.
Figure 15:
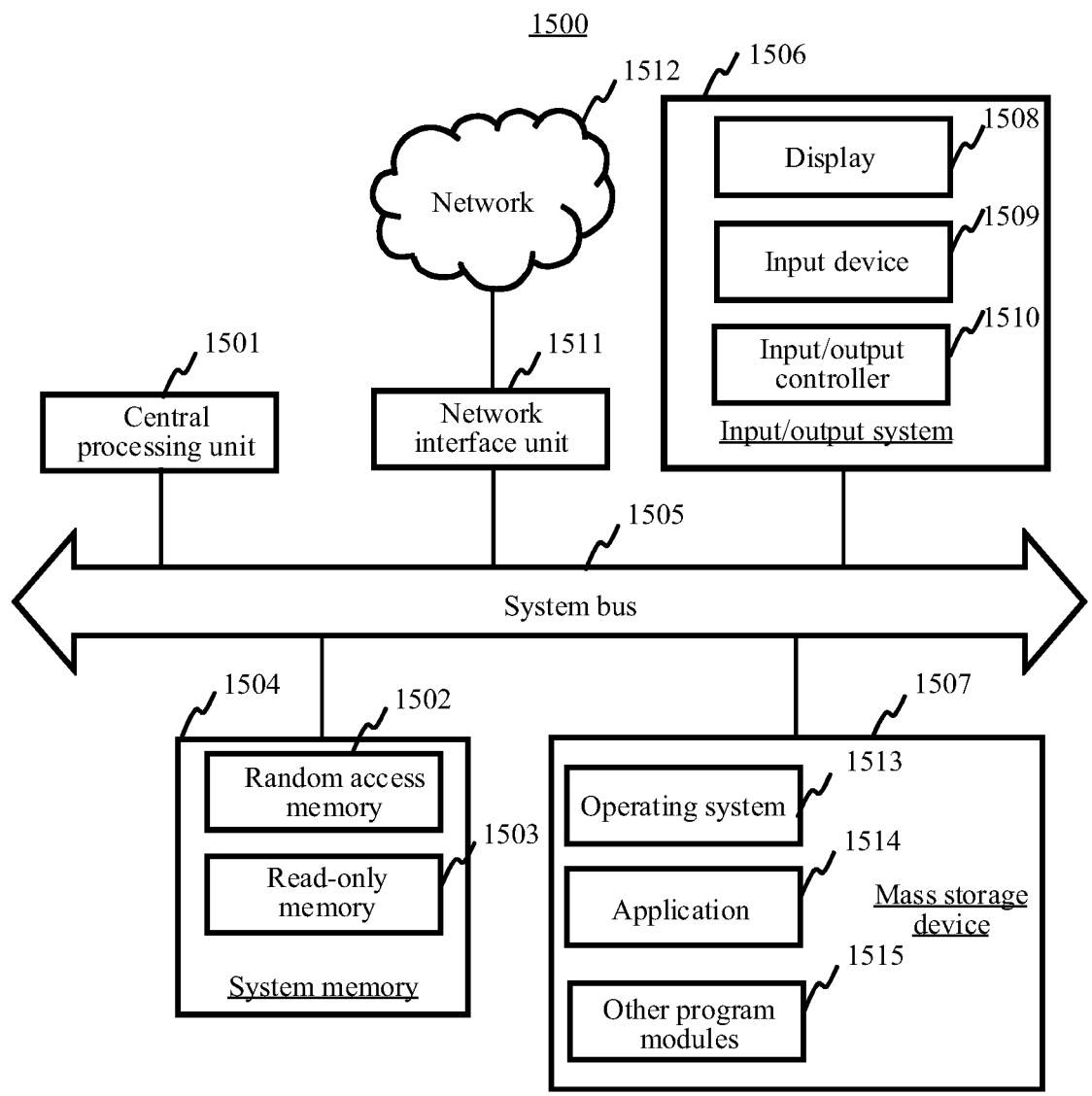
FIG. 15 is a schematic structural diagram of a computer device according to some embodiments.

FIG. 14 is a schematic structural diagram of an apparatus according to some embodiments. The apparatus may be implemented as an entire computer device or a part of the computer device by using software, hardware, or a combination thereof, and the apparatus 1400 includes:

a sequence generation module 141, configured to generate an image sequence according to a biological feature image, the image sequence including the biological feature image and n local image blocks, the local image blocks being obtained by segmenting the biological feature image, n being a positive integer;

a feature extraction module 142, configured to generate a feature vector group based on the image sequence, feature vectors in the feature vector group being generated based on a feature information interaction result between the biological feature image and the local image blocks and a feature information interaction result between the local image blocks; and a classification module 143, configured to take a feature vector corresponding to the biological feature image in the feature vector group as biological feature information of the biological feature image.

In some embodiments, the feature extraction module 142 is further configured to linearly map the image sequence into an input vector group, the input vector group including n+1 one-dimensional vectors; and input the input vector group into an encoder model, and output the feature vector group.

In some embodiments, the feature extraction module 142 is further configured to input the input vector group into the self-attention layer, and generate a key vector group, a query vector group, and a value vector group based on the input vector group; generate a score array based on a product of the key vector group and the query vector group; calculate a weight value of the value vector group based on the score array; and perform point multiplication and summation on the weight value and the value vector group to generate the feature vector group.

In some embodiments, the feature extraction module 142 is further configured to calculate the key vector group based on a product of the input vector group and a key matrix, the key matrix being obtained by training the encoder model; calculate the query vector group based on a product of the input vector group and a query matrix, the query matrix being obtained by training the encoder model; and calculate the value vector group based on a product of the input vector group and a value matrix, the value matrix being obtained by training the encoder model.

In some embodiments, the feature extraction module 142 is further configured to normalize the score array according to a dimension of the one-dimensional vector in the input vector group; and perform exponential normalization on the normalized score array, and calculate the weight value.

In some embodiments, the sequence generation module 141 is further configured to segment the biological feature image into n equally-sized local image blocks through a grid structure; resize the biological feature image to be the same as the size of the local image blocks; and arrange the n local image blocks with the resized biological feature image at the head of a sequence to generate the image sequence.

In some embodiments, the classification module 143 is further configured to perform data processing on the biological feature information through a first classification network, and output a first prediction score, the first classification network being used for classifying the biological feature information according to living body information in the biological feature information.

A determination module 143 is configured to determine that an object in the biological feature image is a living body according to the first prediction score.

In some embodiments, the determination module 143 is further configured to perform data processing on the biological feature information through an image depth network, and output a depth map of the biological feature image; and determine that an object in the biological feature image is a living body in response to the first prediction score being greater than a determination threshold and the depth map being not an all-zero map, the all-zero map representing that pixel values of all pixel points in an image being all zero.

In some embodiments, the classification module 143 is further configured to perform data processing on the biological feature information through a second classification network, and output a second prediction score, the second classification network being used for classifying the biological feature information according to identity information in the biological feature information.

The determination module 143 is further configured to determine that an organism in the biological feature image is a target organism according to the second prediction score.

The apparatus further includes: a training module 145.

In some embodiments, the training module 145 is configured to construct a first training data set, the first training data set including a first target training sample and a pseudo depth map corresponding to the first target training sample; input the first target training sample into the encoder model, and output a first training feature vector; input the first training feature vector into an image depth network, and output a training image depth of the target training sample; and train the encoder model based on errors of the training image depth and the pseudo depth map.

In some embodiments, the training module 145 is configured to construct a second training data set, the second training data set including a second target training sample and a real label corresponding to the second target training sample; input the second target training sample into the encoder model, and output a second training feature vector; input the second training feature vector into a classification network, and output a pseudo label of the target training sample; and train the encoder model based on errors of the pseudo label and the real label.

In summary, according to some embodiments, an inputted biological feature image is segmented into several parts, and a feature vector group is extracted from the original biological feature image and local image blocks obtained after segmentation, so as to obtain biological feature information of the biological feature image. According to the method, global feature information is obtained through the biological feature image, local feature information is obtained through the local image blocks, global-to-local and local-to-local relationships are introduced, and the biological feature information can be extracted from a more comprehensive perspective, so that the extracted biological feature information is more accurate.

Since the inputted biological feature image includes enough original feature information, a good feature basis is provided for living body detection, the combination of the method with other models is facilitated to obtain more detailed detection results, and some embodiments introduce a common framework transformer model in natural language processing to extract relationships between different local image blocks in an image sequence. Certainly, these relationships include both a relationship between a local image and a local image and a relationship between a local image and a global image. Finally, the output of a corresponding position of a scaled biological feature image is taken as biological feature information of the biological feature image, which is then input into a subsequent classification network for determination. Meanwhile, a depth map constraint is imposed on corresponding features of the original biological feature image, thereby ensuring that the features can contain enough original information without being only collapsed to some fixed values. The input of the transformer model needs not only local image blocks, but also a complete biological feature image. Therefore, the model may extract features from different dimensions, thereby providing a better feature basis for subsequent tasks. Meanwhile, on the basis of the whole process, the input may be further adjusted to increase the reliability of the model.

FIG. 13 is a schematic structural diagram of a computer device according to some embodiments. The computer device 1500 includes a central processing unit (CPU) 1501, a system memory 1504 including a random access memory (RAM) 1502 and a read-only memory (ROM) 1503, and a system bus 1505 connecting the system memory 1504 to the central processing unit 1501. The computer device 1500 further includes a basic input/output (I/O) system 1506 assisting in transmitting information between components in a computer device, and a mass storage device 1507 configured to store an operating system 1513, an application program 1514, and another program module 1515.

The basic I/O system 1506 includes a display 1508 configured to display information and an input device 1509 such as a mouse or a keyboard that is configured to allow a user to input information. The display 1508 and the input device 1509 are both connected to the central processing unit 1501 through an input/output controller 1510 connected to the system bus 1505. The basic I/O system 1506 may further include the input/output controller 1510, to receive and process inputs from a plurality of other devices, such as the keyboard, the mouse, or an electronic stylus. Similarly, the input/output controller 1510 further provides output to a display screen, a printer, or other types of output devices.

The mass storage device 1507 is connected to the central processing unit 1501 through a mass storage controller (not shown) connected to the system bus 1505. The mass storage device 1507 and an associated computer device readable medium provide non-volatile storage for the computer device 1500. That is, the mass storage device 1507 may include a computer device readable medium (not shown) such as a hard disk or a compact disc ROM (CD-ROM) drive.

In general, the computer device readable medium may include a computer device storage medium and a communication medium. The computer device storage medium includes volatile and non-volatile, removable and non-removable media that are configured to store information such as computer device readable instructions, data structures, program modules, or other data and that are implemented by using any method or technology. The computer device storage medium includes a RAM, a ROM, an erasable programmable ROM (EPROM), an electrically erasable programmable ROM (EEPROM), CD-ROM, a digital video disc (DVD) or another optical memory, a tape cartridge, a magnetic cassette, a magnetic disk memory, or another magnetic storage device. Certainly, those skilled in the art may learn that the computer device storage medium is not limited to the above. The foregoing system memory 1504 and mass storage device 1507 may be collectively referred to as a memory.

According to some embodiments, the computer device 1500 may further be connected, through a network such as the Internet, to a remote computer device on the network. That is, the computer device 1500 may be connected to a network 1511 by using a network interface unit 1512 connected to the system bus 1505, or may be connected to another type of network or a remote computer device system (not shown) by using a network interface unit 1512.

The memory further includes one or more programs. The one or more programs are stored in the memory. The CPU 1501 executes the one or more programs to implement all or some operations of the method for extracting biological features described above.

In some embodiments, a computer-readable storage medium is further provided, the computer-readable storage medium storing at least one instruction, at least one program, a code set or an instruction set, and the at least one instruction, the at least one program, the code set or the instruction set being loaded and executed by the processor to implement the method for extracting biological features in the foregoing method embodiments.

Some embodiments may further provide a computer-readable storage medium, the storage medium storing at least one instruction, at least one program, a code set or, an instruction set, and the at least one instruction, the at least one program, the code set, or the instruction set being loaded and executed by a processor to implement the method for extracting biological features according to the foregoing method embodiments.

In some embodiments, a computer program product including instructions may be provided, the computer program product, when run on a computer device, causing the computer device to perform the method for extracting biological features according to the foregoing aspects.

What is claimed is:

1. A method for extracting biological features, performed by a computer device, the method comprising:
   generating an image sequence according to a biological feature image, the image sequence comprising the biological feature image and n local image blocks, the local image blocks being obtained by segmenting the biological feature image, n being a positive integer;
   generating a feature vector group based on the image sequence, feature vectors in the feature vector group being generated based on a feature information interaction result between the biological feature image and the local image blocks and a feature information interaction result between the local image blocks;
   taking a feature vector corresponding to the biological feature image in the feature vector group as biological feature information of the biological feature image;
   performing data processing on the biological feature information of the biological feature image; and
   determining that an object in the biological feature image is a living body based on the data processing comprising:
   performing data processing on the biological feature information through an image depth network, and outputting a depth map of the biological feature image; and determining that an object in the biological feature image is a living body based on a first prediction score being greater than a determination threshold and the depth map being not an all-zero map, the all-zero map representing that pixel values of all pixel points in an image being all zero.

2. The method according to claim 1, wherein the generating a feature vector group comprises:
linearly mapping the image sequence into an input vector group, the input vector group comprising n+1 one-dimensional vectors; and
inputting the input vector group into an encoder model, and outputting the feature vector group.

3. The method according to claim 2, wherein the encoder model comprises a self-attention layer, and
the inputting the input vector group into an encoder model, and outputting the feature vector group comprises:
inputting the input vector group into the self-attention layer, and generating a key vector group, a query vector group, and a value vector group based on the input vector group;
generating a score array based on a product of the key vector group and the query vector group;
calculating a weight value of the value vector group based on the score array; and
performing point multiplication and summation on the weight value and the value vector group to generate the feature vector group.

4. The method according to claim 3, wherein the generating a key vector group, a query vector group, and a value vector group based on the input vector group comprises:
calculating the key vector group based on a product of the input vector group and a key matrix, the key matrix being obtained by training the encoder model;
calculating the query vector group based on a product of the input vector group and a query matrix, the query matrix being obtained by training the encoder model; and
calculating the value vector group based on a product of the input vector group and a value matrix, the value matrix being obtained by training the encoder model.

5. The method according to claim 3, wherein the calculating a weight value of the value vector group comprises:
normalizing the score array according to a dimension of the one-dimensional vector in the input vector group; and
performing exponential normalization on the normalized score array, and calculating the weight value.

6. The method according to claim 1, wherein the generating an image sequence comprises:
segmenting the biological feature image into n equally-sized local image blocks through a grid structure;
resizing the biological feature image to be the same as the size of the local image blocks; and
arranging the n local image blocks with the resized biological feature image at the head of a sequence to generate the image sequence.

7. The method according to claim 1, wherein:
the performing data processing on the biological feature information is performed through a first classification network, and outputting the first prediction score, the first classification network being used for classifying the biological feature information according to living body information in the biological feature information, and the determining that the object in the biological feature image is the living body is according to the first prediction score.

8. The method according to claim 1, further comprising:
performing data processing on the biological feature information through a second classification network, and outputting a second prediction score, the second classification network being used for classifying the biological feature information according to identity information in the biological feature information; and
determining that an organism in the biological feature image is a target organism according to the second prediction score.

9. An apparatus for extracting biological features, comprising:
at least one memory configured to store program code; and
at least one processor configured to read program code and operate as instructed by the program code, the program code comprising:
sequence generation code configured to cause at least one of the at least one processor to generate an image sequence according to a biological feature image, the image sequence comprising the biological feature image and n local image blocks, the local image blocks being obtained by segmenting the biological feature image, n being a positive integer;
feature extraction code configured to cause at least one of the at least one processor to generate a feature vector group based on the image sequence, feature vectors in the feature vector group being generated based on a feature information interaction result between the biological feature image and the local image blocks and a feature information interaction result between the local image blocks;
classification code configured to cause at least one of the at least one processor to take a feature vector corresponding to the biological feature image in the feature vector group as biological feature information of the biological feature image;
performing code configured to cause at least one of the at least one processor to perform data processing on the biological feature information of the biological feature image; and
determining code configured to cause at least one of the at least one processor to determine that an object in the biological feature image is a living body based on the data processing comprising:
performing data processing on the biological feature information through an image depth network, and outputting a depth map of the biological feature image; and
determining that an object in the biological feature image is a living body based on a first prediction score being greater than a determination threshold and the depth map being not an all-zero map, the all-zero map representing that pixel values of all pixel points in an image being all zero.

10. The apparatus according to claim 9, wherein
the feature extraction code is further configured to cause at least one of the at least one processor to:
linearly map the image sequence into an input vector group, the input vector group comprising n+1 one-dimensional vectors; and
input the input vector group into an encoder model, and output the feature vector group.

11. The apparatus according to claim 10, wherein the encoder model comprises a self-attention layer; and the feature extraction code is further configured to cause at least one of the at least one processor to:

input the input vector group into the self-attention layer, and generate a key vector group, a query vector group, and a value vector group based on the input vector group;

generate a score array based on a product of the key vector group and the query vector group;

calculate a weight value of the value vector group based on the score array; and perform point multiplication and summation on the weight value and the value vector group to generate the feature vector group.

12. The apparatus according to claim 11, wherein the feature extraction code is further configured to cause at least one of the at least one processor to:

calculate the key vector group based on a product of the input vector group and a key matrix, the key matrix being obtained by training the encoder model;

calculate the query vector group based on a product of the input vector group and a query matrix, the query matrix being obtained by training the encoder model; and calculate the value vector group based on a product of the input vector group and a value matrix, the value matrix being obtained by training the encoder model.

13. The apparatus according to claim 11, wherein the feature extraction code is further configured to cause at least one of the at least one processor to:

normalize the score array according to a dimension of the one-dimensional vector in the input vector group; and perform exponential normalization on the normalized score array, and calculate the weight value.

14. A non-transitory computer-readable storage medium, storing computer code that when executed by at least one processor causes the at least one processor to at least:

generate an image sequence according to a biological feature image, the image sequence comprising the biological feature image and n local image blocks, the local image blocks being obtained by segmenting the biological feature image, n being a positive integer;

generate a feature vector group based on the image sequence, feature vectors in the feature vector group being generated based on a feature information interaction result between the biological feature image and the local image blocks and a feature information interaction result between the local image blocks;

take a feature vector corresponding to the biological feature image in the feature vector group as biological feature information of the biological feature image;

perform data processing on the biological feature information of the biological feature image; and determine that an object in the biological feature image is a living body based on the data processing comprising:

performing data processing on the biological feature information through an image depth network, and outputting a depth map of the biological feature image; and determining that an object in the biological feature image is a living body based on a first prediction score being greater than a determination threshold and the depth map being not an all-zero map, the all-zero map representing that pixel values of all pixel points in an image being all zero.

15. The non-transitory computer-readable storage medium according to claim 14, wherein the generate a feature vector group comprises:

linearly mapping the image sequence into an input vector group, the input vector group comprising n+1 one-dimensional vectors; and inputting the input vector group into an encoder model, and outputting the feature vector group.

16. The non-transitory computer-readable storage medium according to claim 15, wherein the encoder model comprises a self-attention layer; and the inputting the input vector group into an encoder model, and outputting the feature vector group comprises:

inputting the input vector group into the self-attention layer, and generating a key vector group, a query vector group, and a value vector group based on the input vector group;

generating a score array based on a product of the key vector group and the query vector group;

calculating a weight value of the value vector group based on the score array; and performing point multiplication and summation on the weight value and the value vector group to generate the feature vector group.

* * * * *